(12) United States Patent  
Sasaki

(10) Patent No.: US 6,430,003 B1
(45) Date of Patent: Aug. 6, 2002

(54) THIN FILM MAGNETIC HEAD AND METHOD OF MANUFACTURING SAME

(75) Inventor: Yoshitaka Sasaki, Yokohama (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/023,814

(22) Filed: Dec. 21, 2001

Related U.S. Application Data

(63) Continuation of application No. 09/192,284, filed on Nov. 16, 1998, now Pat. No. 6,330,127.

(30) Foreign Application Priority Data

Jul. 30, 1998 (JP) .............................. 10-216177
Nov. 11, 1998 (JP) .............................. 10-320963

(51) Int. Cl.$^7$ ................................. G11B 5/31
(52) U.S. Cl. ................ 360/126; 29/603.15
(58) Field of Search ................ 360/119, 122, 360/125, 126, 317; 216/22, 66; 29/603.01, 603.07, 603.11, 603.13, 603.14, 603.15, 603.16, 603.18; 204/192.32, 192.34; 430/311, 312, 313, 314, 316

(56) References Cited

U.S. PATENT DOCUMENTS

| 4,921,508 A | 5/1990 | Nonaka ........................ 360/119 |
| 5,218,499 A | 6/1993 | Wasa et al. .................. 360/126 |
| 5,438,747 A | 8/1995 | Krounbi et al. .......... 29/603.16 |
| 5,600,519 A | 2/1997 | Heim et al. ................. 360/126 |
| 5,617,278 A | 4/1997 | Cheng et al. ................ 360/126 |
| 5,805,391 A | 9/1998 | Chang et al. ................ 360/126 |
| 5,995,343 A | 11/1999 | Imamura ..................... 360/126 |
| 6,055,137 A | 4/2000 | Ishiwata et al. ............. 360/126 |
| 6,111,724 A | 8/2000 | Santini ........................ 360/126 |
| 6,134,080 A | 10/2000 | Chang et al. ................ 360/126 |
| 6,163,436 A | 12/2000 | Sasaki et al. ............... 360/126 |
| 6,204,997 B1 | 3/2001 | Sasaki ......................... 360/126 |
| 6,301,076 B1 * | 10/2001 | Stageberg et al. .......... 360/126 |

FOREIGN PATENT DOCUMENTS

| JP | 1-184611 | 7/1989 |
| JP | 7-26519 | 10/1994 |
| JP | 8-249-614 | 9/1996 |
| JP | 10-188225 | 7/1998 |
| JP | 2000030215 A | 1/2000 |

* cited by examiner

Primary Examiner—David L. Ometz
(74) Attorney, Agent, or Firm—Oliff & Berridge, PLC

(57) ABSTRACT

A thin-film magnetic head and a method of manufacturing the same in which a precise control of a pole width can be performed and a sufficient overwrite characteristic can be obtained. The thin-film magnetic head has a first insulating and second insulating layer, and first and second magnetic layers that include two magnetic poles are magnetically coupled. The first magnetic layer has a magnetic pole tip which has a uniform width portion, while a magnetic pole coupler is located in a back gap area in contact with the second magnetic layer and a yoke which magnetically couples the magnetic pole tip with the magnetic pole coupler. A recording-medium-side edge of the second insulating layer defines a reference position to an air-bearing surface, and a surface of the magnetic pole tip and edge surfaces of the third insulating layer are planarized in one plane.

4 Claims, 27 Drawing Sheets

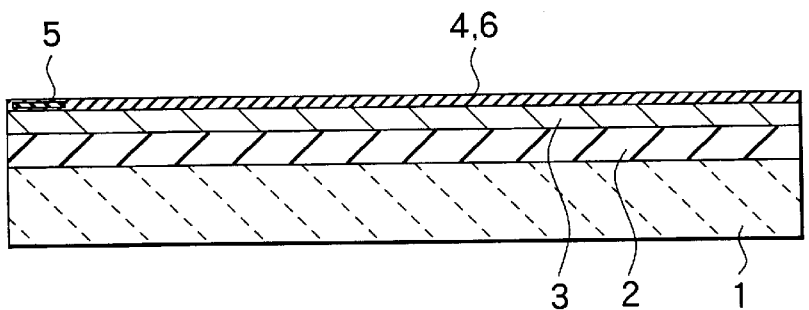 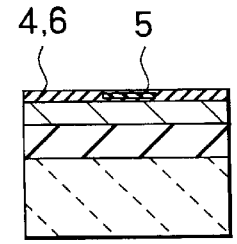
FIG.1A  FIG.1B
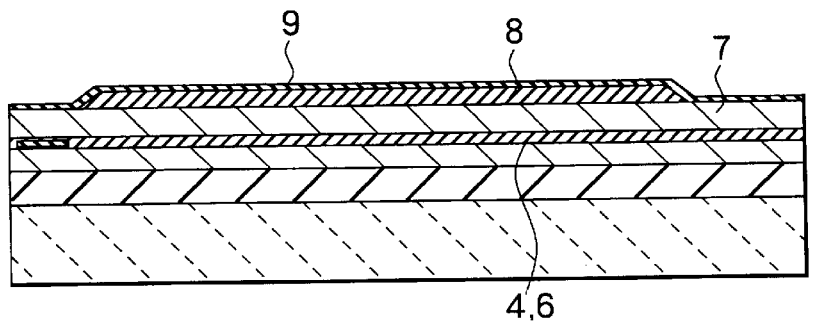 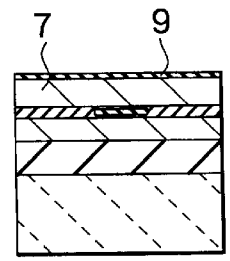
FIG.2A  FIG.2B
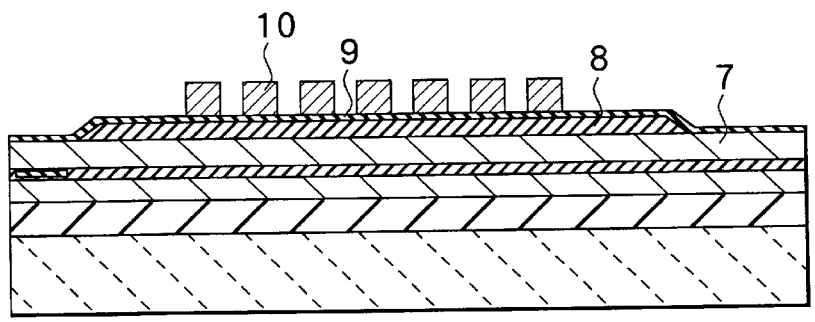 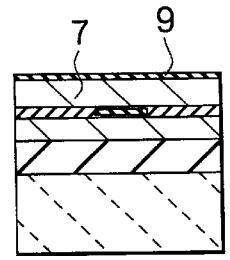
FIG.3A  FIG.3B TH0 (± 0.5 μm) POSITION
POSITION OF STEP FACE

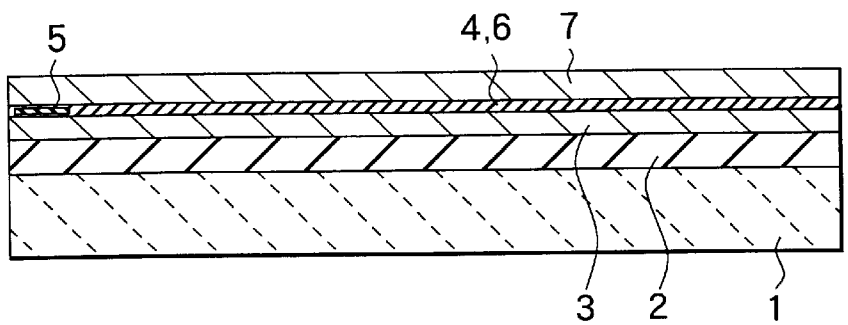 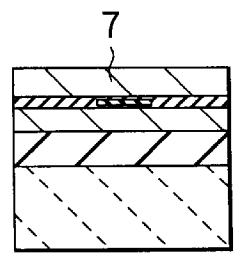
FIG.16A　　　　　　　　　　FIG.16B
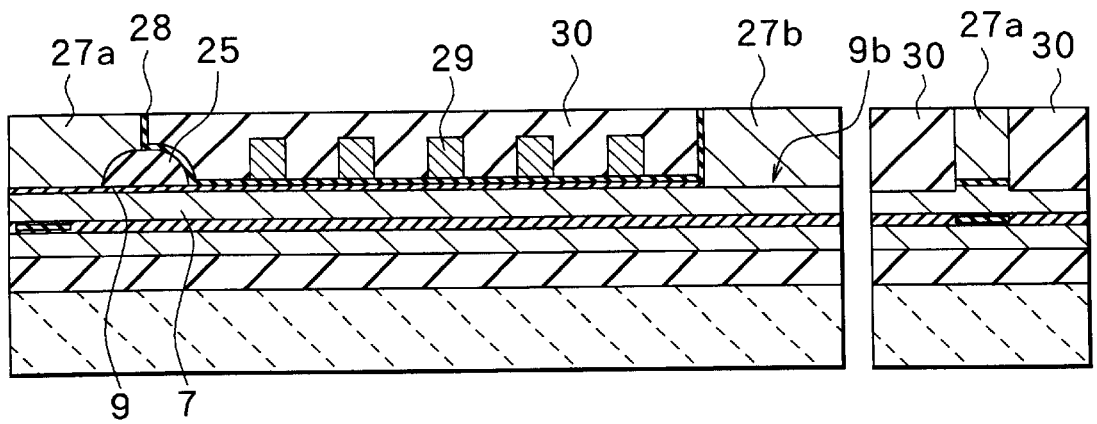 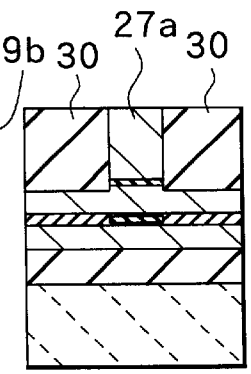
FIG.17A　　　　　　　　　　FIG.17B

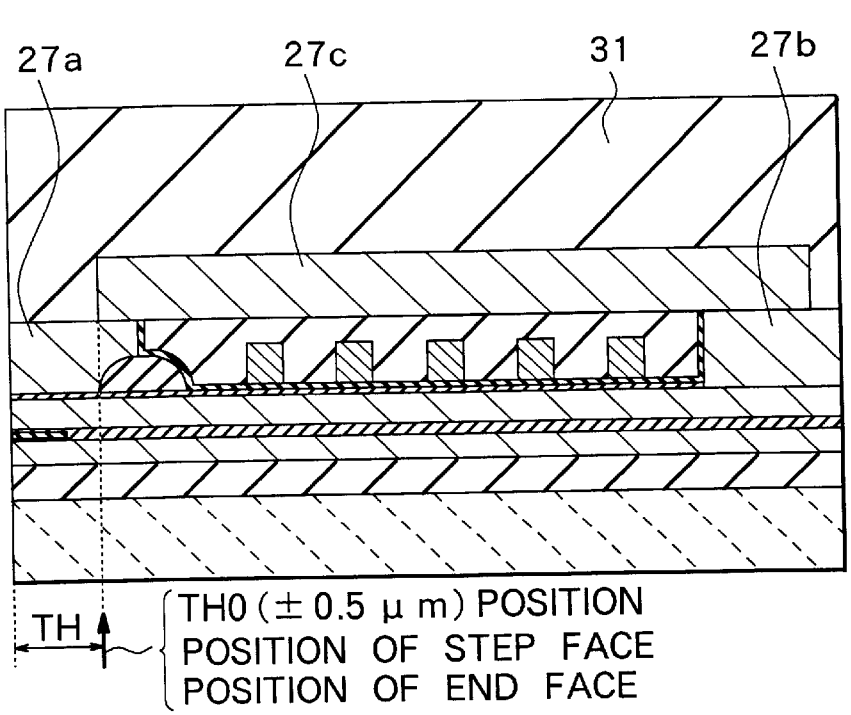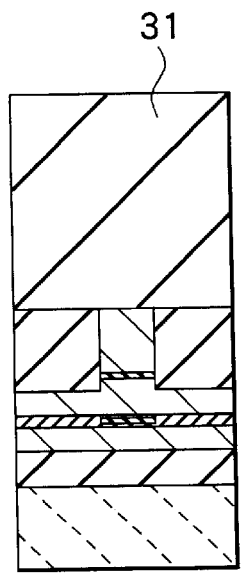
FIG.18A  FIG.18B
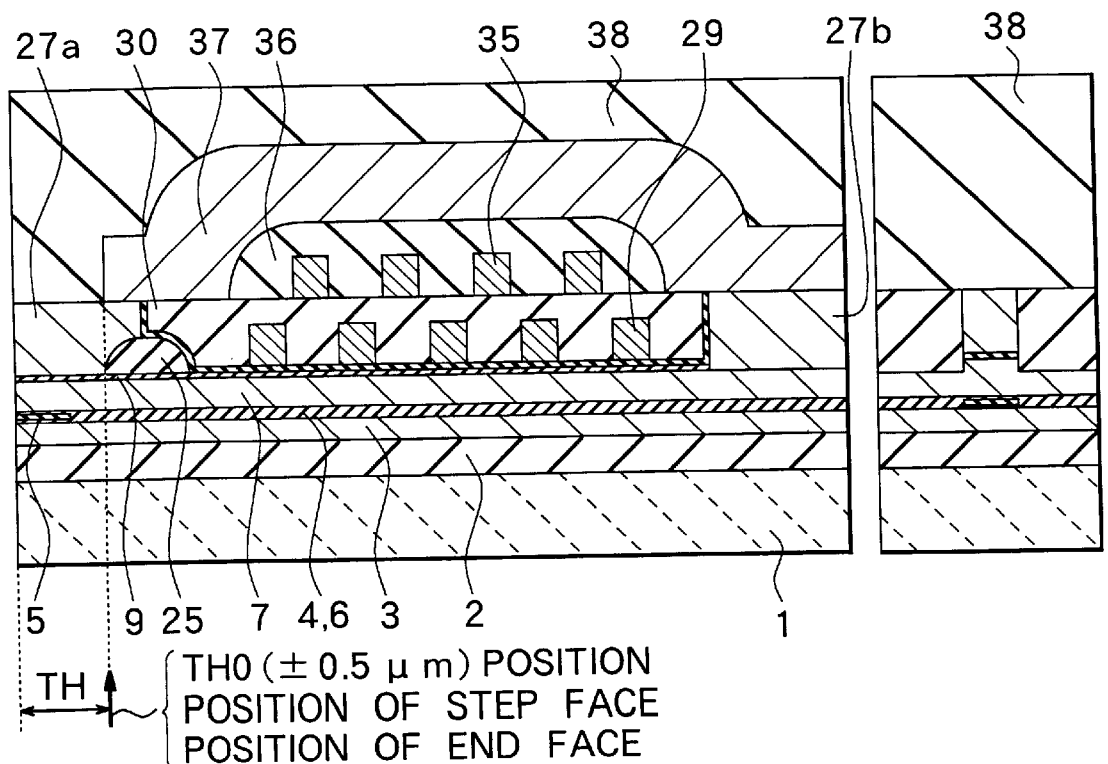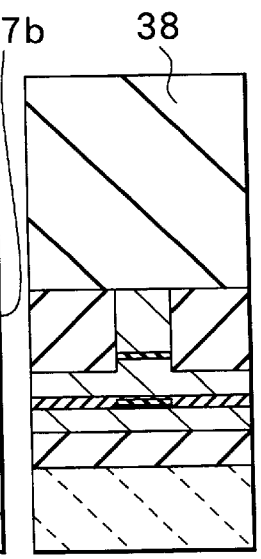
FIG.19A  FIG.19B

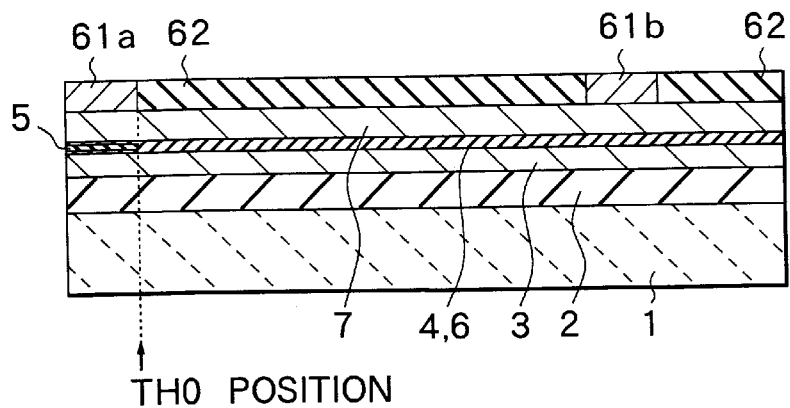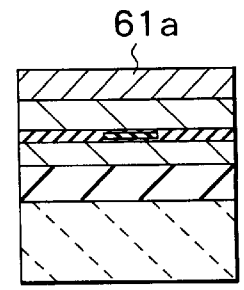
FIG.36A  FIG.36B
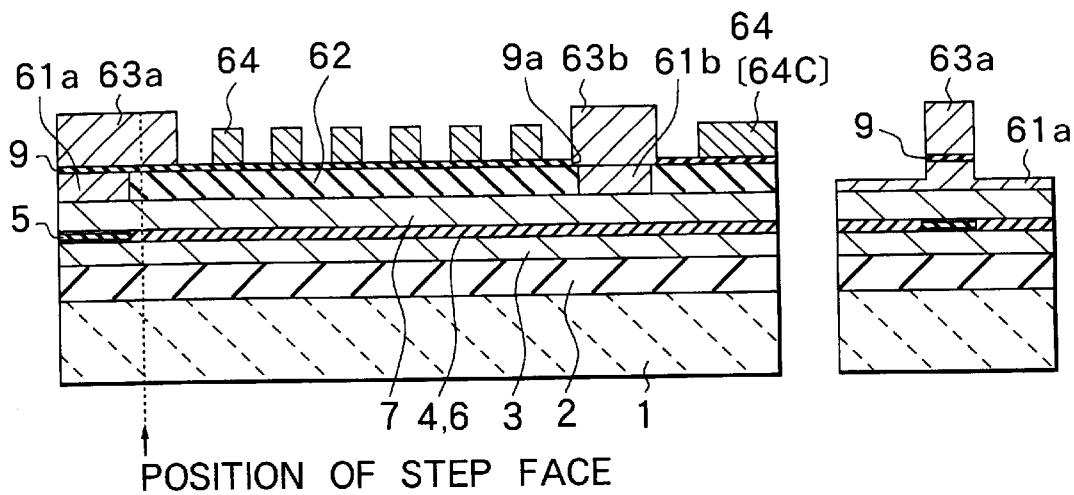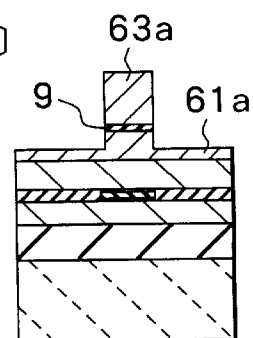
FIG.37A  FIG.37B

THIN FILM MAGNETIC HEAD AND METHOD OF MANUFACTURING SAME

This is a Continuation of application No. of 09/192,284 filed Nov. 16, 1998 now U.S. Pat. No. 6,330,127. The entire disclosure of the prior application is hereby incorporated by reference herein in its entirety.

BACKGROUND OF THE INVENTION

1. Field of the Invention

The present invention relates to a thin-film magnetic head having at least an inductive-type magnetic transducer for writing and a method of manufacturing the same.

2. Description of the Related Art

Improvements in the performance of a thin-film magnetic head are sought since a surface recording density of a hard disk device has been improved. A composite thin-film magnetic head having a structure in which, a recording head having a inductive-type magnetic transducer for writing and a reproducing head having a magneto resistive (referred as MR) element for reading are stacked is broadly used as the thin-film magnetic head. The MR element includes an device using an effect of anisotropic magneto resistive (referred as AMR) and another device using an effect of giant magneto resistive (referred as GMR). The reproducing head using the AMR element is called an AMR head or simply MR head, and the reproducing head using the GMR element is called a GMR head. The AMR head is used as a reproducing head whose surface recording density is over 1 gigabit per square inch, and the GMR head is used as the reproducing head whose surface recording density is over 3 gigabit per square inch.

The AMR head has an AMR film having the AMR effect. The GMR head has a structure identical to the AMR head except that a GMR film having the GMR effect is used instead of the AMR film. However, when the same external magnetic field is applied, the GMR film exhibits greater change in resistance than the AMR film. As a result, the GMR head can increase the reproduction output three to five times the AMR head.

A method is disclosed in which the AMR film being used as the MR film is exchanged with a material with better reactive magnetic resist such as GMR film, and a method in which a pattern width of the MR film, especially the MR height are used as the methods of improving the performance of the reproducing head. The MR height is a length (height) from an edge of air bearing side to an edge of the other side, and it is controlled by an etching amount of the air bearing surface. The air bearing surface, here, is facing a magnetic recording medium and called a track surface as well.

On the other hand, performance improvements in a recording head have been discussed while performances in a reproducing head has improved. A factor which determines the performance of the recording head is a throat height (TH). The throat height is a length (height) of a pole between the air bearing surface and an edge of an insulator which electrically isolates a thin-film coil for generating magnetic flux. A reduction of the throat height is needed in order to improve the recording head performance. The throat height is controlled by an etching amount when the air bearing surface is processed.

To improve a recording density among the performance of the recording head, a track density of magnetic recording medium is required to be increased. In order to achieve this, a recording head with a narrow track structure in which a width of the top and bottom pole on the air bearing surface, which are formed on top and bottom sandwiching a write gap, is reduced from some microns to sub-microns. Semiconductor process techniques are employed to achieve the narrow track structure.

A method of manufacturing the composite thin-film magnetic head as an example of method of manufacturing the thin-film magnetic head of the related art will be described by referring to FIG. 39 through FIG. 44.

As shown in FIG. 39, an insulating film 102 made of alumina ($Al_2O_3$), for example, of about 5 to 10 $\mu$m in thickness is deposited on a substrate 101 made of aluminum oxide and titanium carbide ($Al_2O_3$—TiC), for example. A bottom shield layer 103 for a reproducing head is formed on the insulating film 102. A shield gap film 104 is formed on the bottom shield layer 103 by depositing alumina 100 to 200 nm in thickness through sputtering. An MR film 105 of tens of nanometers in thickness for making up the MR element for reproduction is formed on the shield gap film 104, and a desired shape is obtained by patterning through photolithography with high precision. Next, after forming a lead layer (not shown) on both sides of the MR film 105 as an extraction electrode layer which is electrically connected to the MR film 105, a shield gap film 106 is formed on the lead layer, the shield gap film 104 and the MR film 105, and then the MR film 105 is buried in the shield gap film 104 and 106. Further, a top shield serving as a bottom pole (referred as bottom pole in the following description) 107 made of magnetic materials such as permalloy (NiFe) used for both reproduction and recording head is formed on the shield gap layer 106.

As shown in FIG. 40, an insulating film such as a write gap layer 108 made of alumina film is formed, for example, on the bottom pole 107, and a photoresist layer 109 in a desired pattern is formed on the write gap layer 108 through photolithography with high precision. Next, a thin-film magnetic coil 110 as a first layer for an inductive recording head made of, for example, copper (Cu) is formed on the photoresist layer 109 by, for example, plating method. A photoresist layer 111 in a desired pattern is formed covering the photoresist layer 109 and the coil 110 through photolithography with high precision. Next, a heat treatment at 250° C., for example, is applied to have the coil 110 flattened and have turns of the coil 110 insulated from each other. Further, a thin-film coil 112 as a second layer made of, for example, copper is formed by plating method. A photoresist layer 113 in a desired pattern is formed on the photoresist film 111 and the coil 112 through photolithography with high precision, and a heat treatment at 250° C. is applied to have the coil 112 flattened and have turns of the coil 112 insulate from each other.

As shown in FIG. 41, an opening 108a is formed by partially etching the write gap layer 108 in a position behind the coil 110 and 112 (right-hand side in FIG. 41) in order to form a magnetic path. Further, a top yolk-cum-top pole (referred as a top pole in the following description) 114 made of magnetic materials for recording head such as permalloy is selectively formed on the write gap layer 108, the photoresist layers 109, 111 and 113. The top pole 114 has a contact with the bottom pole 107 in the opening 108a being magnetically coupled. Next, after the write gap layer 108 and the bottom pole 107 are etched about 0.5 $\mu$m by ion milling etching using the top pole 114 as a mask, an overcoat layer 115 made of such as alumina is formed. The thin-film magnetic head is completed after a track surface (air bearing surface) 120 of the recording head and reproducing head are formed by applying machine grinding with a slider.

FIG. 42, 43, and 44 illustrate a completed configuration of the thin-film magnetic head. Here, FIG. 42 shows a sectional view of the thin-film magnetic head orthogonal to the air bearing surface 120, and FIG. 43 is an enlarged cross-sectional view of parallel to the air bearing surface 120 and FIG. 44 is a plan view. FIG. 39 to 42 show a cross section taken along the line A—A' in FIG. 44. An illustration of the overcoat layer 115 is omitted in FIG. 42 to 44.

It is important to form the throat height (TH), an apex angle (θ), a pole width (P2W) and a pole length P2L shown in FIG. 42 and 43 precisely in order to improve the performance of the thin-film magnetic head. The apex angle θ is an angle between the corner of the track surface of the photoresist layer 109, 111 and 113, and a straight line connecting the surface of the top pole 114. The pole width P2W provides a width of a recording track in a recording medium. The pole length P2L represents the thickness of the pole. Further, in FIG. 42 and 44, 'TH0 position' represents a reference position 0 of the throat height, that is, a position of a track-side edge of the photoresist layer 109 which is an insulating layer, electrically isolating the thin-film coils 110 and 112 from each other.

As shown in FIG. 43, a structure in which each sidewall of the top pole 114, the write gap layer 108 and a portion of the bottom pole 107 is vertically formed in a self-aligned manner is called a trim structure. The trim structure prevents an increase of the effective track width occurred through expansion of the magnetic flux generated during writing of a narrow track. As shown in FIG. 43, a lead layer 121 as an extraction electrode layer being electrically connected to the MR film is provided on both sides of the MR film 105. However, an illustration of the lead layer 121 is omitted in FIG. 39 to 42 and 44.

FIG. 45 illustrates a plan structure of the top pole 114. As shown in the illustration, the top pole 114 consists mostly of a yolk area 114a and a pole tip 114b having almost a constant width W1 as the pole width P2W. At a coupling point of the yolk 114a and the pole tip 114b, an outer frame of the yolk 114 has an angle α against a surface parallel to the air bearing surface 120, while an outer frame of the pole tip 114b has an angle β against the surface parallel to the air bearing surface 120. Here, a is, for example, about 45 degrees and β is 90 degrees. The width of pole tip 114b defines the width of the recording track. The pole tip 114b includes an area F in front of the TH0 position (air bearing surface 120 side) and an area R behind the TH0 position (yolk 114a side). As shown in FIG. 4, the area F is constant on the flat surface of the write gap layer 108, the area R and the yolk 114a are constant on an coil area (referred as apex in the following description) being swelled up, covered by the photoresist film 109, 111 and 113. 16. The publication relating to the shape of the top pole is, for example, Japanese Patent application Laid-open Hei 8-249614 (U.S. Pat. No. 5,600,519).

Since the pole width P2W determines the track width of the recording head, the pole width P2W needs to be formed precisely. Especially, recently, to make high surface density recording possible, that is to form the recording head having a narrow track structure, micro lithography having a size of the pole width P2W of the top pole equal to or less than 1.0 µm is required.

As a method of forming the top pole, shown in, for example, Japanese Patent Application Laid-open Hei 7-262519 (U.S. Pat. No. 5,438,747), frame plating method is used. In a case where the top pole 114 is formed by frame plating method, a thin electrode film made of, for example, permalloy is formed all over the apex area by, for example, sputtering. Next, after applying a photoresist on it, a pattern is obtained through lithography procedure to form a frame (outer frame) for plating. The top pole 114 is formed by plating method having the electrode film as a seed layer.

By the way, the apex area and the other areas have, for example, more than 7 to 10 µm difference in heights. A photoresist of 3 to 4 µm in thickness is applied on the apex area. If the photoresist with equal to or more than 3 µm in film thickness on the apex is needed, a photoresist film with for example, equal to or more than 8 to 10 µm in film thickness is formed in the lower part of the apex area since the photoresist with liquidity gathers into a lower area.

To form a narrow track as described above, a frame pattern with a width of about 1.0 µm depending on the photoresist film is needed to be formed. That is, micro pattern with a width of 1.0 µm or less has to be formed depending on the photoresist film with equal to or more than 8 to 10 µm in thickness. However, forming the photoresist film with such a thick film with a narrow pattern width has been difficult.

Further, during an exposure of photolithography, a light for the exposure reflects with the undercoat electrode film as a seed layer and the photoresist is exposed by the reflecting light. As a result, deformation of the photoresist pattern occurs and so that a sharp and precise photoresist pattern can not be obtained. Consequently, the top pole can not be formed in a desired shape since sidewalls of the top pole take a shape being rounded. Especially, as shown in FIG. 8, when the top pole width P2W is made further narrower to have W1', the desired width W1' becomes harder to obtain. It is because the width of the photoresist pattern defining the top pole width P2W is wider than the desired value and the shape becomes the one shown with a dotted line in FIG. 8 since among the pole tip area 114b, in an area R being placed on the apex area, the reflecting light being reflected from the undercoat electrode film includes not only the reflecting light of orthogonal direction but the reflecting lights of diagonal direction or lateral direction from the slope of the apex area resulting in giving an influence to photosensitivity of the photoresist layer. Among the pole tip area 114b, a width of the area F is an extremely important factor in defining the track width on the recording medium. As a result, if the width of the area F becomes wider than the value W1' described above, the narrow track width as desired can not be obtained.

Same problems exists in the magnetic head claimed in the Japanese Patent Application Laid-open Hei 8-249614. It is because the width of the front area of the TH0 position cannot be controlled precisely under the influence of an exposure of the photoresist layer given by the reflecting light from a slope of the apex area in diagonal and lateral direction since the pole width from the TH0 position to the yolk area changes moderately.

As shown in FIG. 46, the connecting area R from the TH0 to the yolk area 114a of the pole tip area 114b has about the same width with the front area of the TH0 having a small cross sectional view area, the magnetic flux from the yolk area 114a is saturated in the area R so that the flux can not sufficiently reach the area F which determines the track width. For that, an overwrite characteristic, that is, a characteristic in a case where a data is written on a recording medium over the already-written data, becomes as low as 10 to 20 dB so that a sufficient overwrite characteristic can not be obtained.

A publication relating to the present invention includes Japanese Patent Application Laid-open Hei 1-184611 and Japanese Patent Application Hei 10-188225. An inductive thin-film magnetic head having a magnetic core which comprises a rectangular pole tip with about the same width with a track width facing a magnetic medium and a back core having a wide cross sectional area of the pole tip, and an angle between the pole tip and the back core is about 90 degrees is claimed in the Japanese Patent Application Laid-open Hei 1-184611. In the Japanese Patent Application Laid-open Hei 10-188225, a inductive thin-film magnetic head is disclosed. In the magnetic head, a projected area which determines the track width is formed on one side of the pole film, and the size of each portion of the projected area is set to a specific value.

The present invention is designed to overcome the forgoing problems. It is an object of the invention to provide a thin-film magnetic head in which precise control of the pole width is performed and, at the same time, a sufficient overwrite characteristic can be obtained even in a case where the pole width is reduced.

SUMMARY OF THE INVENTION

A thin film magnetic head of the invention includes a first insulating layer as a write gap layer, and a second insulating layer provided in a predetermined area on a recording medium side in contact with a surface of the first insulating layer. First and second magnetic layers include two magnetic poles which face each other with the first insulating layer in between, and are positioned to face with a recording medium. The first and second magnetic layers being magnetically coupled to each other in a back gap area on an opposite side of an air-bearing surface facing the recording medium, and the first magnetic layer has a magnetic pole tip which in turn has a uniform width portion for defining a write track width on the recording medium. The magnetic pole tip extends from the air-bearing surface to a predetermined position on the second insulating layer in contact with the surfaces of the first and second insulating layers. A magnetic pole coupler is located in the back gap area in contact with the second magnetic layer and a yoke which magnetically couples the magnetic pole tip with the magnetic pole coupler. A thin film coil is located between the first and second magnetic layers, and a third insulating layer covers an inner surface of a recessed space surrounded by the first and second insulating layers, the magnetic pole tip and the magnetic pole coupler. In the thin film magnetic head, a recording-medium-side edge of the second insulating layer defines a reference position to the air-bearing surface, and a surface of the magnetic pole tip, the surface being on a side opposite to the first insulating layer, and edge surfaces of the third insulating layer are planarized in one plane.

The invention also includes a method of manufacturing a thin film magnetic head having the steps of forming a first insulating layer as a write gap layer, providing a second insulating layer in a predetermined area on a recording medium side in contact with a surface of the first insulating layer and forming first and second magnetic layers to be magnetically coupled to each other in a back gap area on an opposite side of an air-bearing surface facing the recording medium. The first and second magnetic layers include two magnetic poles which face each other with the first insulating layer in between and are positioned to face with a recording medium, and the first magnetic layer has a magnetic pole tip which has a uniform width portion for defining a write track width on the recording medium. The magnetic pole extends from the air-bearing surface to a predetermined position on the second insulating layer in contact with the surfaces of the first and second insulating layers. A magnetic pole coupler is located in the back gap area in contact with the second magnetic layer and a yoke which magnetically couples the magnetic pole tip with the magnetic pole coupler. The method forms a thin film coil between the first and second magnetic layers, and forms a third insulating layer to cover an inner surface of a recessed space surrounded by the first and second insulating layers, the magnetic pole tip, and the magnetic pole coupler. Then, a surface of the magnetic pole tip is planarizing to form one plane with at least edge surfaces of the third insulating layer, the surface of the magnetic pole tip being on a side opposite to the first insulating layer. The second insulating layer is formed so that a recording-medium-side edge of the second insulating layer defines a reference position to the air-bearing surface in the step of forming the second insulating layer.

A thin-film magnetic head of the invention includes at least two magnetic layers magnetically coupled to each other including two magnetic poles in part of sides of the area facing a recording medium, the magnetic poles being opposed to each other with a gap layer in between; and a thin-film coil unit placed between the magnetic layers with an insulating layer in between. At least one of the two magnetic layers including: a first magnetic layer portion with a constant width for defining a width of a recording track of a recording medium extending from a recording medium opposite surface facing to the recording medium to an edge of the insulating layer closer to the recording medium or its vicinity; and a second magnetic layer portion magnetically coupled to the first magnetic layer portion at the edge of the insulating layer or its vicinity. A step in the width direction is formed in a coupling point of the first magnetic layer portion and the second magnetic layer portion so as to have a width of the first magnetic layer portion at the coupling point smaller than a width of the second magnetic layer portion at the coupling point.

A method of manufacturing the thin-film magnetic head of the invention includes a step of forming at least two magnetic layers magnetically coupled to each other including two magnetic poles in part of sides of the area facing a recording medium, the magnetic poles being opposed to each other with a gap layer in between; and a step of forming a thin-film coil unit between the magnetic layers with an insulating layers in between. At least one of the magnetic layers is formed so as to include a first magnetic layer portion with a constant width for defining a width of a recording track of a recording medium extending from a recording medium opposite surface facing to the recording medium to an edge of the insulating layer closer to the recording medium or its vicinity, and a second magnetic layer portion magnetically coupled to the first magnetic layer portion at the edge of the insulating layer or its vicinity; and a step in the width direction is formed in a coupling point of the first magnetic layer portion and the second magnetic layer portion so as to have a width of the first magnetic layer portion at the coupling point smaller than a width of the second magnetic layer portion at the coupling point.

In the thin-film magnetic head or the manufacturing method of the same of the invention, the recording track width of the recording medium is defined according to the specific width of the first magnetic layer portion. The first magnetic layer portion is magnetically coupled to the second magnetic layer portion whose width is wider than that of the first magnetic layer portion at the edge close to the recording medium in the insulating layer or its vicinity, and a step in the direction of the width is formed at the coupling point.

Further, the step face of the second magnetic layer portion at the coupling point may be substantially orthogonal to the extending direction of the first magnetic layer portion.

Further, the edges of the step face of the second magnetic layer portion may be rounded off.

Further, the width of the second magnetic layer portion may be almost constant all through the area.

Further, the width of the second magnetic layer portion may differ depending upon the position.

Further, the width of the second magnetic layer portion may become wider as the distance from the coupling point becomes larger.

Further, in the thin-film magnetic head of the invention and method of manufacturing the same, one of the magnetic may include a third magnetic layer portion magnetically connected to the second magnetic layer portion having larger width and area than the second magnetic layer portion.

Further, in the thin-film magnetic head of the invention and the method of manufacturing the same, the first magnetic layer portion and the second magnetic layer portion may be formed in a same procedure in a same body.

Further, in the thin-film magnetic head of the invention and the method of manufacturing the same, the first magnetic layer portion, the second magnetic layer portion and the third magnetic layer portion may be formed in a same procedure in a same body.

Further, in the thin-film magnetic head in the invention and the method of manufacturing the same, the first magnetic layer portion and the second magnetic layer portion may be formed in a same procedure in a same body, and the third magnetic layer portion may be formed in a different procedure in a separate body from the first and second magnetic layer portion.

Further, in the thin-film magnetic head of the invention and the method of manufacturing the same, the third magnetic layer portion may be placed overlapping at least a portion of the second magnetic layer portion.

Further, in the thin-film magnetic head of the invention and the method of manufacturing the same, the third magnetic layer portion may go over the coupling point and be placed overlapping a portion of the first magnetic layer portion, and an edge of the third magnetic layer closer to the recording medium may be orthogonal to the extending direction of the first magnetic layer portion. In such a case, the width of the first magnetic layer portion which determines the recording track width of the recording medium is exactly constant all through the area from the orthogonally crossing point to the top area even if a concave corner of the step face in the width direction at the coupling point is rounded off, since the coupling point of the first and the second magnetic layer portion is receded from the edge face of the third magnetic layer. Here, the position of the edge surface of the third magnetic layer portion may be set in the same position of the edge of the insulating layer closer to the recording medium. In such a case, the width of the first magnetic layer which determines the recording track width of the recording medium is exactly the same all through the area so-called a throat height.

Further, in the thin-film magnetic head of the current invention and the method of manufacturing the same, at least some portion of the second magnetic layer portion may be set on the slope surface formed by an insulating layer. In such a case, even if a concave corner of the step in the width direction at the coupling point is relatively quite rounded off due to the fact that the second magnetic layer portion is formed on the slope mentioned above, and so that a condition of exposure during a procedure of a photolithography for forming the first magnetic layer portion is made worse, variance of the substantial width of the first magnetic layer can be avoided.

Another object, distinctive characters and effects of the current invention will be made clear in the following descriptions.

BRIEF DESCRIPTION OF THE DRAWINGS

FIG. 1A and FIG. 1B are cross sectional views for describing a procedure of the method of manufacturing of a thin-film magnetic head of a first embodiment of the current invention.

FIG. 2A and FIG. 2B are cross sectional views for describing the procedure following FIG. 1A and FIG. 1B.

FIG. 3A and FIG. 3B are cross sectional views for describing the procedure following FIG. 2A and FIG. 2B.

FIG. 16A and FIG. 16B are cross sectional views for describing a procedure of the method of manufacturing of the thin-film magnetic head according to a second embodiment of the invention.

FIG. 17A and FIG. 17B are cross sectional views for describing the procedure following FIGS. 16A and 16B.

FIG. 18A and FIG. 18B are cross sectional views for describing the procedure following FIGS. 17A and 17B.

FIG. 19A and FIG. 19B are cross sectional views showing a modification of the thin-film magnetic head according to the second embodiment of the invention.

FIG. 33B FIG. 35A and FIG. 35B are cross sectional views following FIG. 34A and FIG. 34B.

FIG. 36A and FIG. 36B are cross sectional views for describing a procedure of the method of manufacturing of the thin-film magnetic head according to a fifth embodiment.

FIG. 37A and FIG. 37B are cross sectional views following FIG. 36A and FIG. 36B.

DETAILED DESCRIPTION OF THE PREFERRED EMBODIMENTS

Figures 4A, 4B:
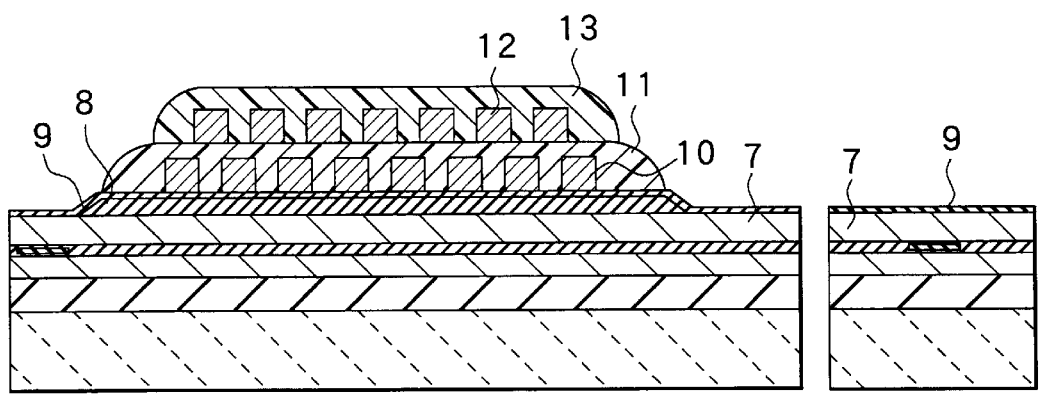
FIG. 4A and FIG. 4B are cross sectional views for describing the procedure following FIG. 3A and FIG. 3B.

Preferred embodiments of the invention will now be described in detail with reference to the accompanying drawings.

First Embodiment

A method of manufacturing a composite thin-film magnetic head as a method of manufacturing a thin-film magnetic head according to a first embodiment of the invention will be described with reference to FIGS. 1 to 8. The thin-film magnetic head of the embodiment will be shown specifically in the method of manufacturing the thin-film magnetic head of the embodiment and so that both will together be described in the followings. Each of FIGS. 1A to 7A shows a cross sectional view vertical to an air bearing surface and each FIGS. 1B to 7B shows a cross sectional view parallel to the air bearing surface of a top pole. FIG. 8 illustrates a plan structure of the composite thin-film magnetic head.

In the manufacturing method according to the embodiment, as shown in FIG. 1A and FIG. 1B, an insulating layer 2 made of alumina ($Al_2O_3$), for example, of about 3 to 5 μm in thickness is deposited on a substrate 1 made of aluminum oxide and titanium carbide ($Al_2O_3$ TiC), for example. Next, permalloy of about 3 μm in thickness is selectively formed on the insulating layer 2 by plating with using a photoresist as a mask to form a bottom shield layer 3 for reproducing head.

Further, alumina of 100 to 200 nm in thickness, for example, is deposited on the bottom shield layer 3 through sputtering to form a shield gap film 4. An MR film 5 of tens of nanometers or less in thickness is formed on the shield gap film 4 for making up an MR element for reproduction, and photolithography with high precision is applied to have a desired shape. Next, after forming a lead layer (not shown) as an extraction electrode layer which is electrically connected to the MR film 5 on both sides of the MR film 5, a shield gap film 6 is formed on the lead layer, the shield gap film 4 and the MR film 5, and the MR film 5 is buried in the shield gap film 4 and 6.

Further, as shown in FIGS. 2A and 2B, a top shield layer-cum-bottom pole (called bottom pole in the following description) 7 of about 3 to 4 μm in thickness made of, for example, permalloy is selectively formed on the shield gap film The bottom pole 7 corresponds to at least one of 'two magnetic layers' of the invention.

Next, after forming an inorganic insulating film such as a silicon dioxide film ($SiO_2$), for example, of about 1 to 2 μm in thickness on the bottom pole 7, an insulating film 8 for defining an apex angle and a throat height is formed by selectively patterned through taper etching. For the insulating layer 8, not only a silicon dioxide but also an alumina film or a silicon nitride (SiN) film and so on may be used. Alternatively, the film may be formed by sputtering or CVD (Chemical Vapor Deposition) method. Next, a write gap layer 9 made of an insulating film such as alumina film is formed on the bottom pole 7 and the insulating layer 8.

As shown in FIGS. 3A and 3B, a first layer of a thin-film coil 10 of 2 to 3 μm in thickness for an inductive recording head made of, for example, copper (Cu) is formed on the write gap layer 9 by, for example, electroplating.

As shown in FIGS. 4A and 4B, a photoresist layer 11 is formed to a desired pattern through photolithography with high precision on the write gap layer 9 and the coil 10. Next, a heat treatment at 250° C. is applied for flattening the coil 10 and insulating between the coils 10.

Further, a second layer of a thin-film coil 12 of 2 to 3 μm in thickness made of, for example, copper is formed on the photoresist layer 11 by, for example, electroplating. A photoresist layer 13 in a desired pattern is formed on the photoresist layer 11 and the thin-film coil 12 by lithography with high precision, and a heat treatment at 250° C. is applied for flattening the coil 12 and having turns of the coil 12 insulated.

Figures 5A, 5B:
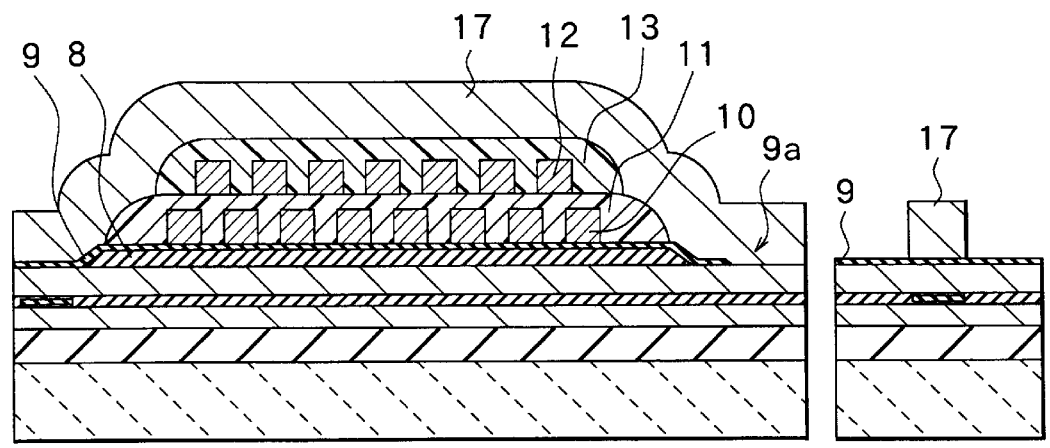
FIG. 5A and FIG. 5B are cross sectional views for describing the procedure following FIG. 4A and FIG. 4B.
Figure 9:
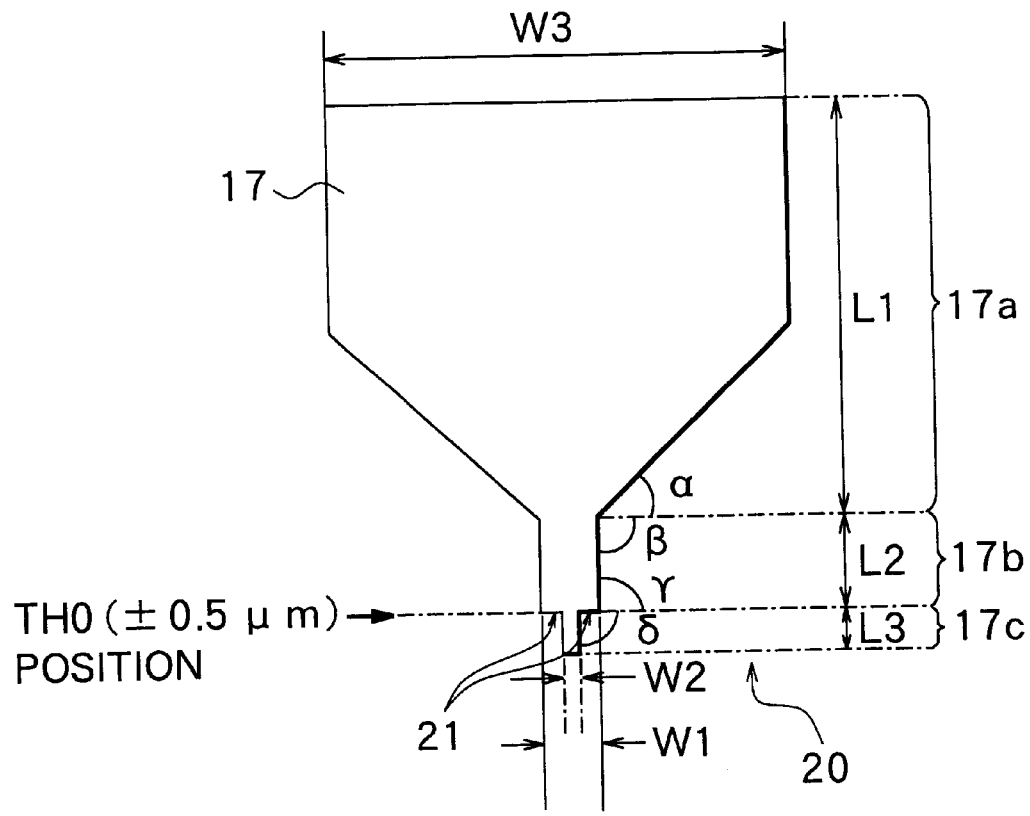
FIG. 9 is a plan view showing a plan structure of the top pole in the thin-film magnetic head as shown in FIG. 8.

As shown in FIGS. 5A and 5B, an opening 9a in the back (right side in FIG. 5A) of the coil 10 and 12 is formed by selectively etching the write gap layer 9 to form a magnetic path. Next, an electrode film (not shown) which is to be a seed layer in electroplating is formed by forming NiFe-system alloy, which is a material with high saturation flux density, of about 70 nm in thickness by, for example, sputtering before forming a top pole. A photoresist pattern (not shown) which is to be a frame for forming the top pole is formed by applying photoresist on the electrode film, patterning it using photolithography and applying frame plating. After forming a top yolk-cum-top pole (called top pole in the following) 17 of about 3 to 5 in thickness by electroplating using the photoresist pattern as a mask and the electrode layer as a seed layer, the photoresist pattern is removed. The top pole 17 takes a plan shape as shown in FIG. 9, for example, and has a contact with the bottom pole 7 in the opening 9a and is magnetically connected. For the top pole 17, for example, a material with high saturation flux density such as permalloy (NiFe) or ferrous nitride (Fen) may be used. The shape of the top pole 17 will be described later. The top pole 17 corresponds to 'at least one of two magnetic layers' in the invention.

Figures 6A, 6B:
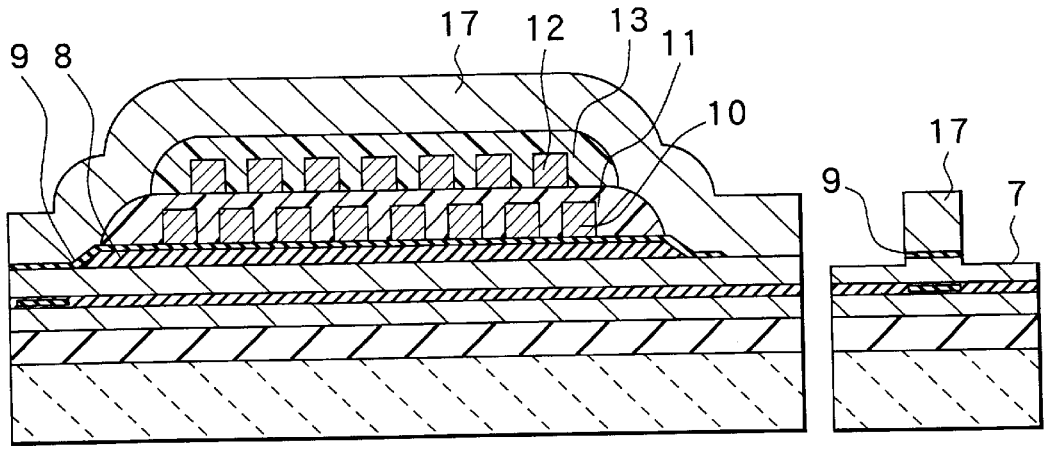
FIG. 6A and FIG. 6B are cross sectional views for describing the procedure following FIG. 5A and FIG. 5B.

As shown in FIG. 6A and FIG. 6B, a trim structure is formed by etching the write gap layer 9 and the bottom pole 7 about 0.5 μm by, for example, ion milling using the top pole 17 as a mask.

Figures 7A, 7B:
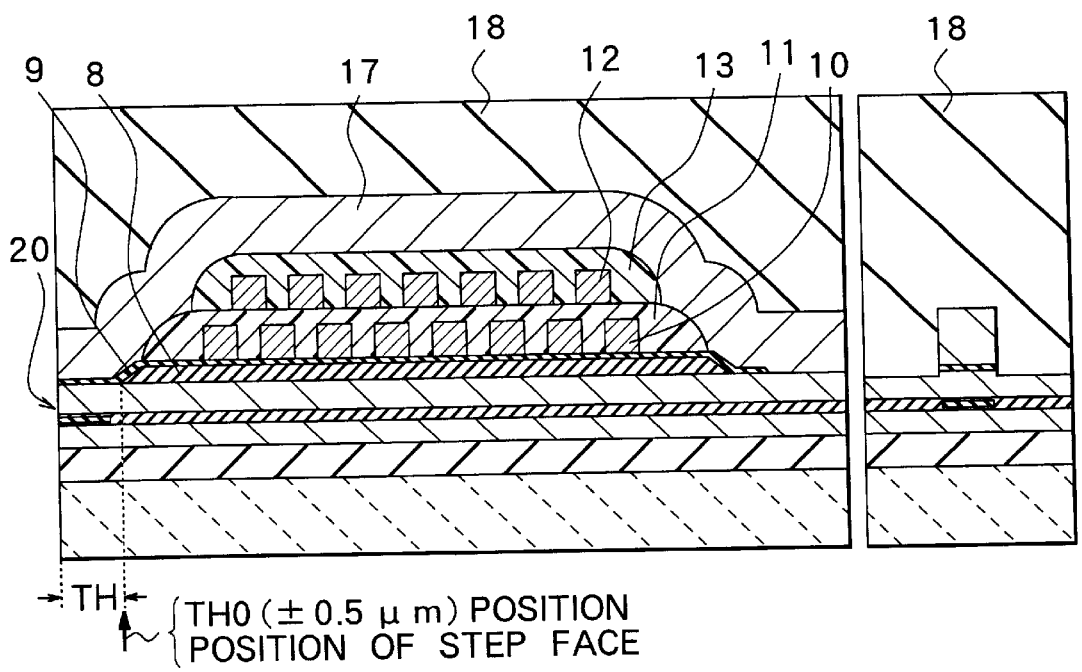
FIG. 7A and FIG. 7B are cross sectional views for describing the procedure following FIG. 6A and FIG. 6B.
Figure 8:
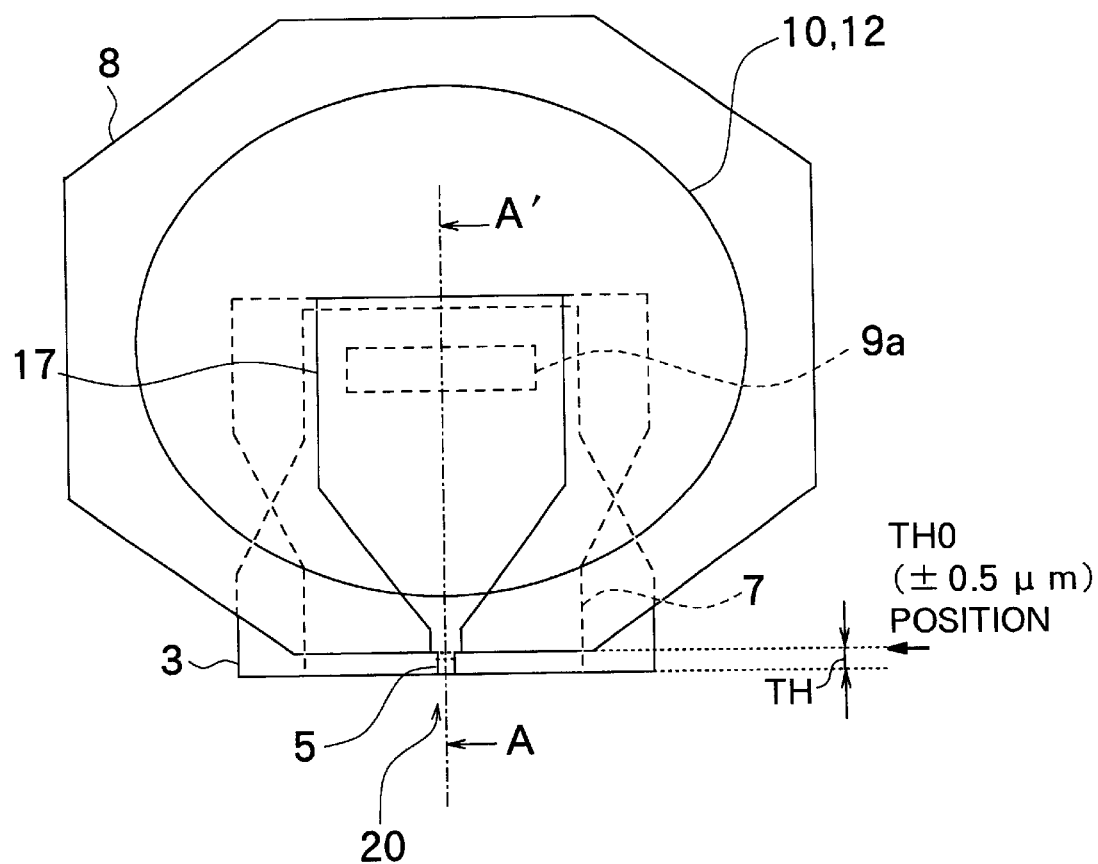
FIG. 8 is a plan view showing a plan structure of a completed thin-film magnetic head.

As shown in FIGS. 7A and 7B, an overcoat layer 18 made of, for example, alumina is formed covering all the surface. The thin-film magnetic head is completed by forming a air bearing surface (track surface) of the recording head and the reproducing head through a slider machinning process.

FIG. 8 is a plan view of the thin-film magnetic head manufactured through the method of manufacturing of the embodiment. In the illustration, the overcoat layer 18 is omitted. As shown, the throat height (TH) is a length from the edge of the pole side of the insulating layer 8 TH0) to an air bearing surface 20. Each of FIG. 1A to FIG. 7A corresponds to a cross section taken along the line A—A' in FIG. 8.

FIG. 9 illustrates a plan structure of the top pole 17. As shown in the illustration, the top pole 17 has a yolk area 17a composing most of the top pole having a width W3, a middle area 17b having almost a constant width W1 and a top area 17c having almost a constant width W2 narrower than W1. The center of each width direction of the yolk area 17a, the middle area 17b and the top area 17c are met with each other. The frame of the yolk area 17a makes an angle α against a surface parallel to the air bearing surface 20, and the side frame surface of the middle area 17b makes an angle β against a surface parallel to the air bearing surface 20 at the coupling point of the yolk area 17a and the middle area 17b. The width of the middle area 17b and the top area 17c each are almost constant all through the area. In the embodiment, α is about 45 degrees, for example, and β is about 90 degrees.

The position of the coupling point of the middle area 17b and the top area 17c of the top pole 17 meets TH0 position or its vicinity. Here, 'vicinity' means a range of ±0.5 μm, for example, from TH0 position. At the coupling point, the width of the middle area 17b is W1 and the width of the top area 17c is W2 narrower than W1. That is, at TH0 position or its vicinity, there is a step in the width direction between the middle area 17b and the top area 17c. An end face (called step face in the following description) 21 of the middle area 17b at the step area makes an angle γ against the side frame surface of the middle area 17b, makes an angle δ with the side frame direction (that is a direction in which the top area 17c is extending) of the top area 17c. In the embodiment, both the angle γ and δ are about 90 degrees. That is, the step face 21 between the top area 17c and the middle area 17b is substantially vertical to the side frame surface of the top area 17c. Here, 'practically vertical' means the angle δ between the main portion of the top area 17 and the main portion of the step face 21 is about 90 degrees including a case where the corner crossing the top area 17 and the step face 21 is a sharp edge, and at the same time, where the corner is rounded off. It is preferable to have the angle d in a range of, for example, 75 to 120 degrees. A round shape of the corner mentioned above can be produced even a portion corresponding to the corner of the mask for forming a photoresist pattern is a sharp edge. Further, even an angle of the portion facing the corner of the mask for forming the photoresist pattern is made exactly 90 degrees, when an amount of exposure is increased during the photolithography procedure, the angle δ of the top pole 17 formed through the procedure mentioned above may be widened to 110 to 120 degrees. Here, the top area 17c of the top pole 17 corresponds to 'a first magnetic layer portion' of the invention, the middle area 17b corresponds to 'a second magnetic layer portion' of the invention and the yolk area 17a corresponds to 'a third magnetic layer portion' of the invention.

As shown in FIGS. 7A and 7B, the top area 17c is placed on the flat write gap layer 9 and the middle area 17b and the yolk area 17a are placed on an apex area which is swelled like a hill made of the photoresist layers 11, 13 and so on. The width W2 of the top area 17c corresponds to the top pole width PW2 defining the track width on the recording medium.

The following values are preferable, for example, as the size of each part shown in FIG. 9.

Figure 46:
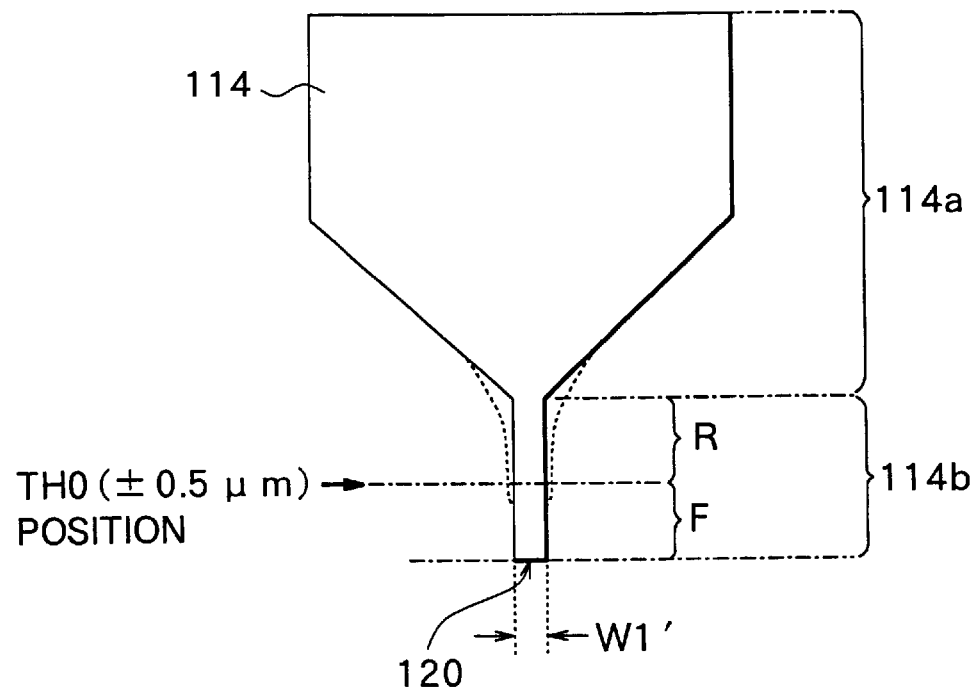
FIG. 46 is a plan view of the top pole for describing problems occurred when applying micro lithography to the top pole in the conventional thin-film magnetic head.

Length L1 of the yolk area 17=10 to 40 μm
Length L2 of the middle area 17b=3.0 to 5.0 μm
Length L3 of the top area 17c (=throat height TH)=0.5 to 1.0 μm
Width W1 of the middle area 17b=2.0 to 4.0 μm
Width W2 of the top area 17c=0.6 to 1.2 μm
Width W3 of the yolk area 17a=20 to 40 μm The thin-film magnetic head with the top pole 17 having such a shape exhibits a high performance in overwrite characteristic. That is, in the top pole 17 as shown in FIG. 17, the width of the middle area 17b coupled to the top area 17c at TH0 position is W1 much larger than the width W2 of the top area 17c which defines the track width on the recording medium, and a volume (or a magnetic volume) of the middle area 17b is much larger than a portion R of the related art (FIG. 46). For this reason, a magnetic flux occurred in the yolk area 17a by the thin-film coil 10 and 12 are not saturated in the middle area 17b and reaches the top area 17c with sufficient amount. Accordingly, even if the top area 17c is applied to a narrow track width such as sub-micron, a sufficient amount of a magnetic flux for overwrite can be obtained. That is, a sufficient overwrite characteristic can be obtained while narrow track is being obtained.

Figure 12:
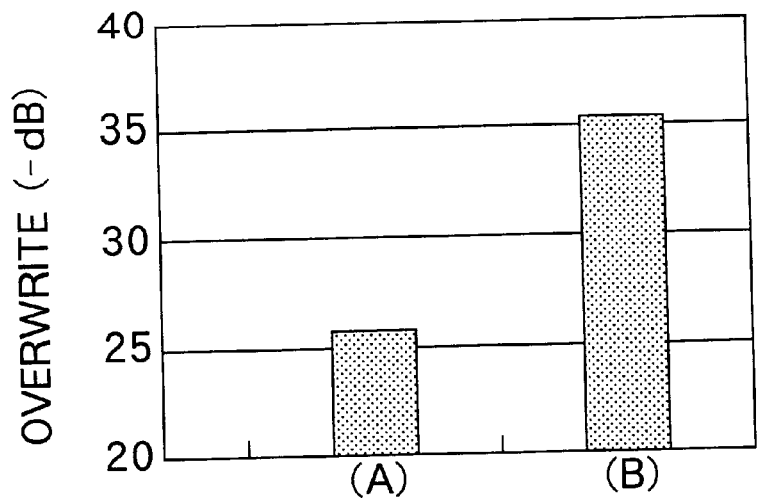
FIG. 12 is an illustration showing a over write characteristic of the thin-film magnetic head shown in FIG. 8 and the thin-film magnetic head of a related art.
Figure 45:
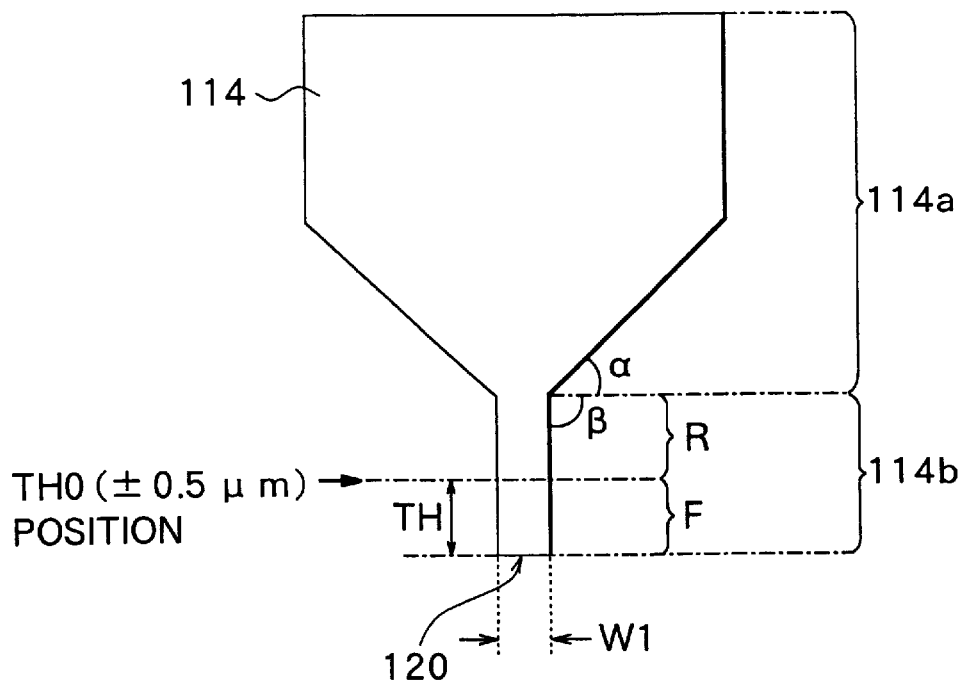
FIG. 45 is a plan view showing a structure of a top pole in the conventional thin-film magnetic head.

FIG. 12 shows the overwrite characteristic of the thin-film magnetic head of both the related art and the embodiment comparing with each other. (A) of FIG. 12 shows the overwrite characteristic of the conventional thin-film magnetic head having a top pole 114 shaped shown in FIG. 45, and (B) of FIG. 12 shows the overwrite characteristic of the thin-film magnetic head of the embodiment having the top pole 17 shaped as shown in FIG. 9. As shown in the figure, the overwrite characteristic has been improved as the value of the thin-film magnetic head of the related art is 26.0 dB, while the value of the thin-film magnetic head of the embodiment is as high as 35.5 dB.

Figure 10:
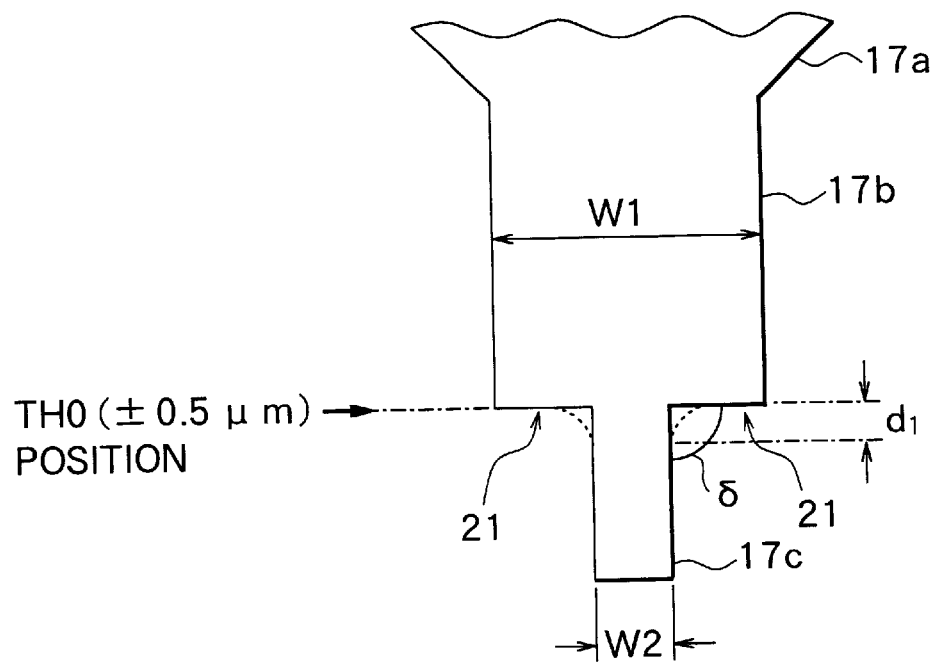
FIG. 10 is an enlarged plan view of a top pole for describing the operation of the thin-film magnetic head shown in FIG. 8.

Further, the thin-film magnetic head with the top pole 17 having a shape described above has advantages as follows even in the manufacturing procedure. That is, as shown in FIG. 10, in the top pole 17 of the thin-film magnetic head of the embodiment, the angle δ between the step face 21 at the coupling point of the top area 17c and the middle area 17b and the side frame surface of the top area 17c is about 90 degrees. As a result, the reflection from the apex area in slanting and side direction occurred during a procedure of photolithography when selectively patterning a photoresist by exposure using a mask is almost shut at the corner of 90 degrees between the step face 21 at TH0 position or its vicinity and the side frame face of the top area 17c. Therefore, the reflection is effectively from reaching a photoresist region for forming the top area 17c. Accordingly, widening of the pattern width of the photoresist region for forming the top area 17c can be suppressed. To be specific, as shown in FIG. 10, a length d1 of part (dotted line in the figure) made wider than a desired width in the top area 17c in the longitudinal direction of the top area 17c can me made extremely short.

Figure 11:
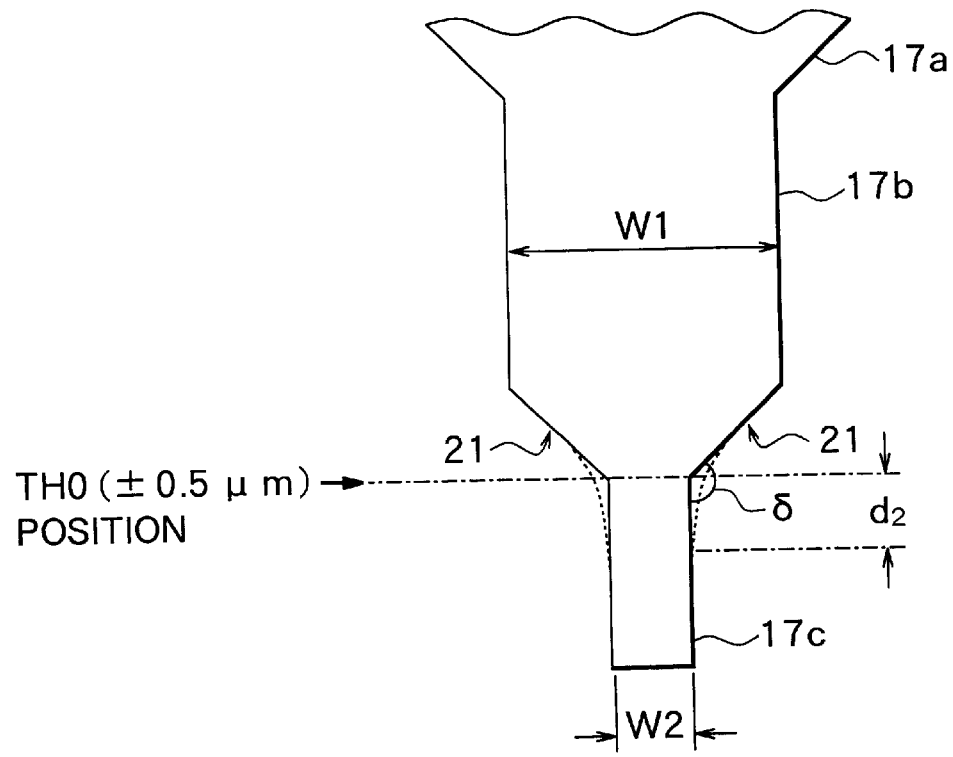
FIG. 11 is an enlarged plan view of the top pole for describing a comparative example of operation to the thin-film magnetic head shown in FIG. 8.

On the other hand, as shown in FIG. 11, in a case where the angle δ between the step face 21 at TH0 position and the frame side surface of the top area 17c is much larger than 90 degrees (for example, 130 degrees), the above mentioned shutting effect of the reflection in the corner is small so that the length d2 of part (dotted line in the figure) made wider than the desired width W2 in the top area 17c becomes longer.

As described above, the width of the top area 17c defining the writing track width on the recording medium can be set to a target value W2 so as to make it possible to have the writing track width narrow since widening of the pattern width of the photoresist region for forming the top area 17c of the top pole 17 can be prevented with the thin-film magnetic head of the embodiment.

As described, with the thin-film magnetic head of the embodiment, a step in the width direction which substantially changes to a right-angle is provided between the top area 17c and the middle area 17b of the top pole 17 at TH0 position or its vicinity, and the width of the middle area 17b is made sufficiently wider than that of the top area 17c which defines the track width, so that widening of the pattern width of the photoresist for forming the top area 17c can be prevented to have the writing track width micronized, and the flux occurred in the yolk area 17a is suppressed to be saturated before reaching the top area 17c so as to maintain a sufficient overwrite characteristic.

Further, the insulating layer 8 defining the throat height TH is formed with inorganic insulating film in the embodiment, so that a shift of the edge of the insulating layer 8 (or pattern shift) and profile deterioration do not occur through a heat treatment at about 250° C. to form the coils 10 and 12. As a result, the throat height can be controlled precisely. Further, the MR height and the apex angle θ can be also controlled precisely.

Further, in the embodiment, the insulating layer 8 for defining the throat height is formed with an inorganic film so that a pattern shift of the insulating layer 8 does not occur while etching the write gap layer 9 and the bottom pole 7 to form a trim structure which also results in obtaining a precise control of the throat height.

Further, in the embodiment, a thick insulating layer 8, besides the thin write gap layer 9, is formed between the bottom pole (top shield) 7 and the thin-film coils 10 and 12 so that a large dielectric withstand voltage between the bottom pole (top shield) 7 and the thin-film coils 10 and 12 can be obtained, and at the same time, a flux leakage from the thin-film coils 10 and 12 can be decreased.

In the embodiment, NiFe or ferrous nitride (FeN), for example, are used as the top pole 17, however, materials with high saturation flux density such as amorphous of Fe—Co—Zr, for example, can be used or more than two kinds of these materials stacked together can be used as well. Further, a magnetic material made up of NiFe and the materials with high saturation flux density mentioned above being stacked together can be used as the bottom pole 7.

Further, the top pole 17 is not limited to the shape shown in FIG. 9. Shapes shown in FIGS. 13 to 15 may also be applicable.

Figure 13:
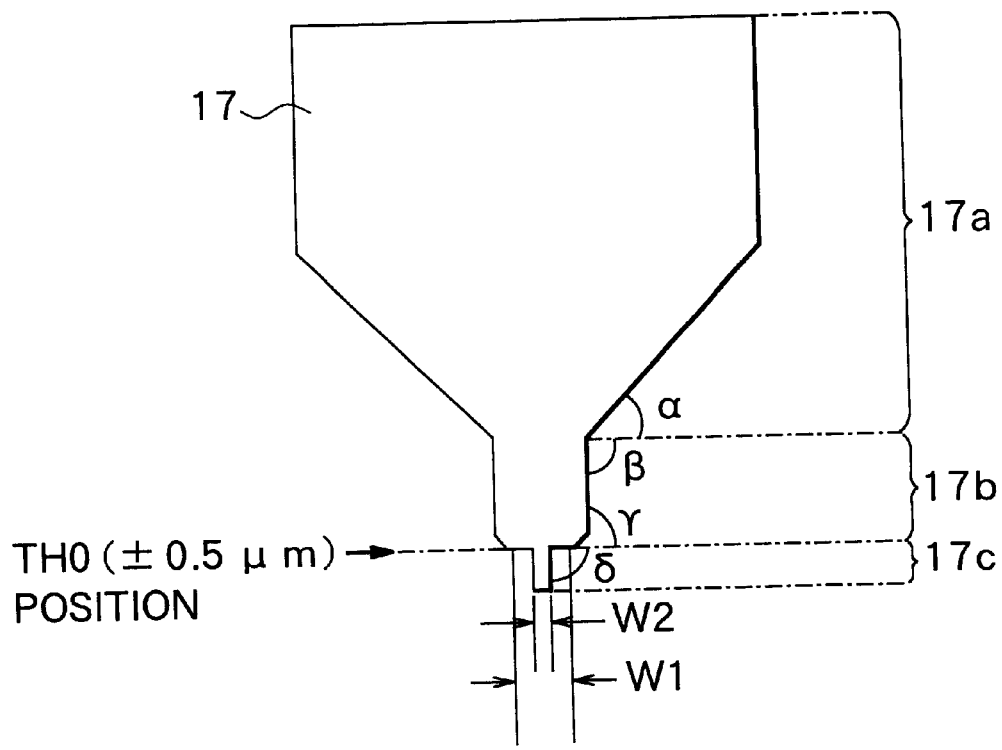
FIG. 13 is a plan view showing a modification of the top pole of the thin-film magnetic head according to a first embodiment of the invention.

FIG. 13 is a plan view of the top pole 17 of which both outer corner of the step face 21 of the middle area 17b at TH0 position is slightly rounded off. The structure except for the part rounded off is identical to FIG. 9. In such a case, the width of the step face 21 after being rounded off is made same with W1.

Figure 14:
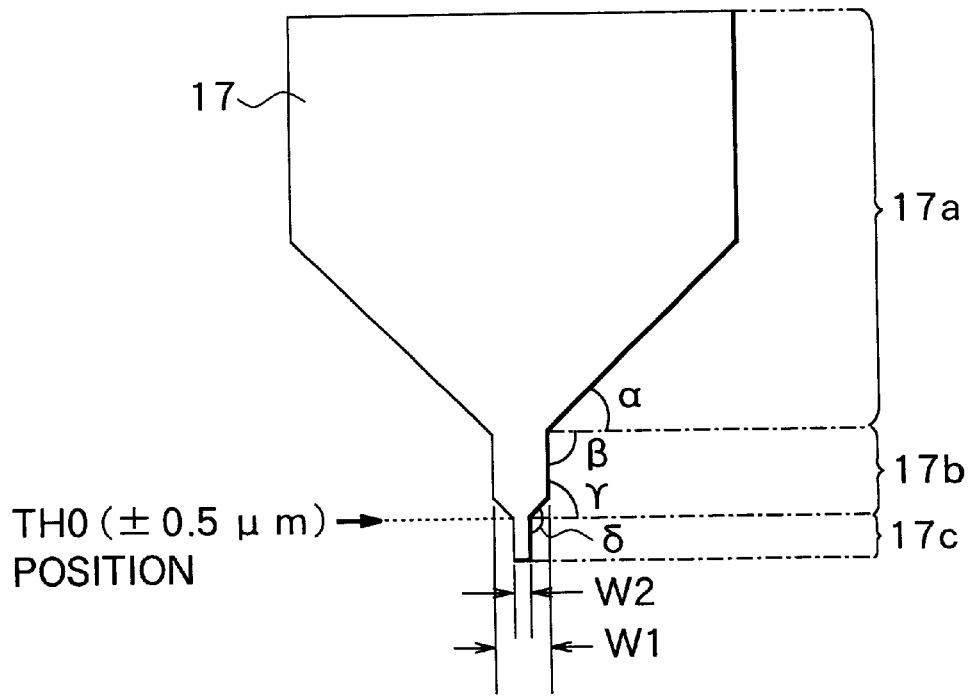
FIG. 14 is a plan view showing another modification of the top pole of the thin-film magnetic head according to the first embodiment of the invention.

FIG. 14 is a plan view of the top pole 17 of which an angle δ between the step face 21 and the side frame surface of the top area 17c at TH0 position is made larger than 90 degrees. The angle δ is made, for example, 90 to 150 degrees, however, a range of 90 to 120 degrees is more preferable.

Figure 15:
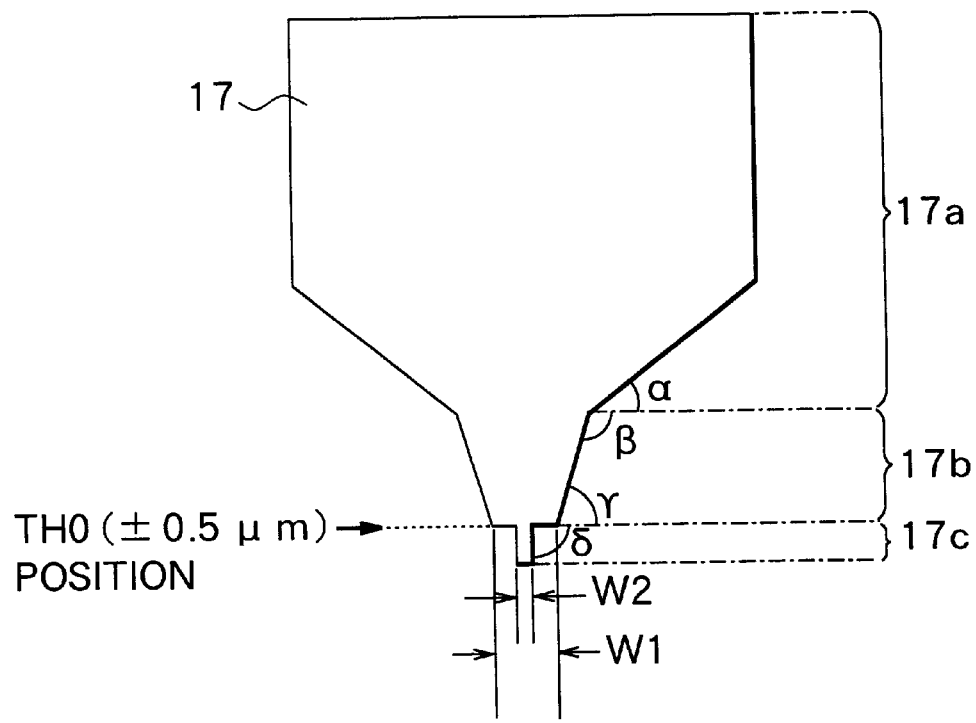
FIG. 15 is a plan view showing still another modification of the top pole of the thin-film magnetic head according to the first embodiment of the invention.

FIG. 15 is a plan view of the top pole 17 of which the angle γ between the side frame surface of the middle area 17b and a surface parallel to the air bearing surface 20 is made smaller than 90 degrees. However, the angle γ is more preferable to be set in a range from 70 to 80 degrees.

In FIGS. 13 to 15, the coupling point of the top area 17c and the middle area 17b is not necessarily met exactly with TH0 position but may be shifted within a range of about, for example, ±0.5 μm from TH0 position.

With the thin-film magnetic head having a top pole 17 shown in FIGS. 13 to 15, same effect as the thin-film magnetic head having a top pole 17 shown in FIG. 9 can be obtained.

Second Embodiment

Next, a second embodiment of the invention will be described.

A method of manufacturing of a composite thin-film magnetic head as a method of manufacturing the thin-film magnetic head of the second embodiment will be described with reference to FIGS. 16A and 16B to FIGS. 19A and 19B. The thin-film magnetic head of the embodiment will be shown specifically in the method of manufacturing of the thin-film magnetic head of the embodiment and so that both will together be described in the followings. Each of FIG. 16A to FIG. 19A illustrates a cross sectional view orthogonal to the air bearing surface and each of FIG. 16B to FIG. 19B illustrates a cross sectional view parallel to the air bearing surface of the top pole area. In the figures, like numerals are adopted to the same elements as those in the above mentioned embodiment.

In the method of manufacturing the thin-film magnetic head according to the embodiment, the procedure of forming from the insulating layer 2 to the bottom pole 7 shown in FIG. 16A and FIG. 16B will be omitted since it is identical to that of the first embodiment shown in FIG. 3A and FIG. 3B.

In the embodiment, after the bottom pole 7 as shown in FIG. 16A and 16B is formed, the write gap layer 9 as shown in FIG. 17A and FIG. 17B is formed and an insulating pattern 25 for defining the throat height TH is formed on the write gap layer 9. Next, an opening 9a for forming a magnetic path is formed by selectively etching the write gap layer 9 in a position which is back (right-hand side in FIG. 17A) of the region where a thin-film coil 29 is formed in the later procedure. Next, a top pole tip 27a which is to be a portion of the top pole is formed selectively in a area form the insulating pattern 25 to the area of the track-opposite-surface side (air bearing surface side) by, for example, electroplating and, at the same time, a magnetic path forming pattern 27b is formed in the opening 9a. For example, materials with high saturation flux density such as alloy including permalloy (NiFe) or alloy including ferrous nitride (FeN) are used as the top pole 27a and the magnetic path forming pattern 27b.

The top pole tip 27a and the magnetic path forming pattern 27b are formed as follows, for example. First, an electrode film (not shown) as a seed layer for electroplating is formed by about 70 nm in thickness through, for example, sputtering. The seed layer is made of alloy including NiFe which is a material with high saturation flux density. Next, a photoresist pattern (not shown) is formed by applying photoresist on the electrode film, patterning it by photolithography and applying frame plating. Next, the top pole tip 27a and the magnetic path forming pattern 27b of about 3 to 5 μm in thickness are formed by electroplating using photoresist pattern as a mask, and the electrode film as a seed layer, then, the photoresist pattern is removed. The top pole tip 27a takes a shape shown in FIG. 20 and 21, for example. The shape of the top pole tip 27a will be described in the followings.

Next, a trim structure is formed by etching the write gap layer 9 and the bottom pole about 0.3 to 0.5 μm by, for example, ion milling using the top pole 17 as a mask. The trim structure is for suppressing the widening of the substancial track width when writing.

Next, after forming an insulating film 28 of 0.5 to 1.5 μm in thickness, made of such as alumina film all over, a thin-film coil 29 of 2 to 3 μm in thickness made of, for example, copper (Cu) for an inductive recording head is formed by, for example, electroplating. After forming an insulating film 30 of about 3 to 4 μm in thickness made of such as alumina film all over, the top surfaces of the top pole tip 27a and the magnetic path forming pattern 27b are exposed by polishing so that the whole surface is flattened through, for example, CMP (chemical machine polishing).

Next, as shown in FIGS. 18A and 18B, the top yolk-cum-top pole (called top pole in the followings) 27c of about 3 to 5 μm in thickness is formed by electroplating through the same procedure as that of forming the top pole tip 27a and the magnetic path forming pattern 27b. The top pole 27c takes a shape shown in FIG. 20, for example, being in a contact and magnetically connected to both the magnetic path forming pattern 27b and the top pole tip 27a. For example, materials with high saturation flux density such as permalloy (NiFe) or ferrous nitride (FeN) are used as the top pole 17. Here, the top pole 27c corresponds to a 'third magnetic layer portion' of the invention.

Next, an overcoat layer 31 made of, for example, alumina is formed covering the whole surface. Then, the thin-film magnetic head is completed by forming the air bearing surface (track surface) of the recording head and the reproducing head by performing a slider machining process.

Only one layer of the thin-film coil 29 is formed here, however, as shown in FIGS. 19A and 19B, a second layer of thin-film coil 35 may be formed on the insulating layer 30 covering the thin-film coil 29 and, after covering it by the photoresist layer 36, a top pole 37 may be selectively formed thereon.

Figure 20:
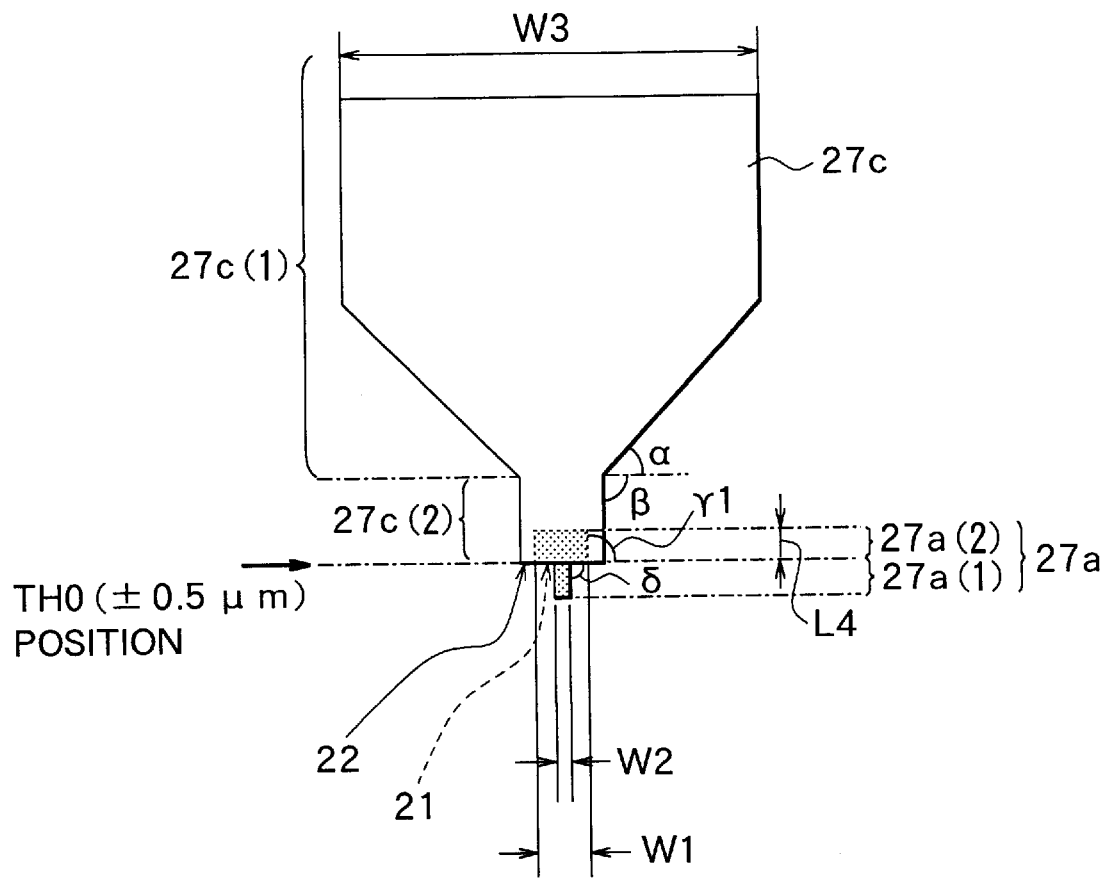
FIG. 20 is a plan view showing a plan structure of the top pole and a top pole tip of the thin-film magnetic head according to the second embodiment of the invention.
Figure 21:
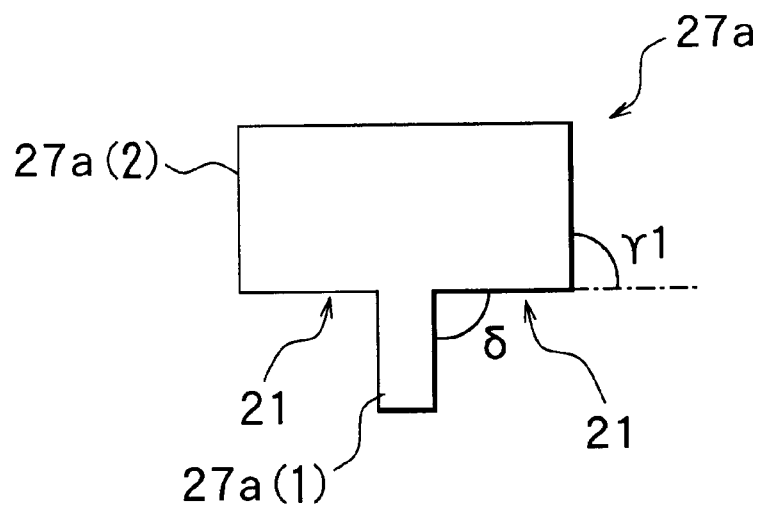
FIG. 21 is a plan view plan view showing an enlarged plan structure of the top pole tip shown in FIG. 20.

FIG. 20 illustrates a plan structure of the top pole 27c and the top pole tip 27a and FIG. 21 illustrates a plan structure of the top pole tip 27a. As shown in FIG. 20, the top pole 27c comprises a yolk area 27c(1) which occupies most portion of the top pole 27c having a width W3 and a connecting area 27c(2) which overlaps the top pole tip 27a in some portion. The shape of the yolk area 27c(1) is identical to the yolk area 17a of the top pole 17 in the first embodiment. The width of the connecting area 27c(2) is made wider than the width of the middle area 17b of top pole 17 in the first embodiment. The centers of each width direction of the yolk area 27c(1) and the connecting area 27c(2) are formed to be met mutually.

As shown in FIG. 21, the top pole tip 27a has a top area 27a(1) defining the writing track width on the recording medium and a middle area 27a(2) connected to the connecting area 27c(2) of the top pole 27c. The middle area 27a(2) has a width W1 which is same as that of the middle area 17b of the top pole 17 in the first embodiment, and has a length L4. The top area 27a(1) has a width W2 which is same as that of the top pole 17c in the first embodiment. The coupling point of the top area 27a(1) and the middle area 27a(2) is almost met with TH0 position and, at the same time, met with the edge face in front (air bearing side) of the connecting area 27c(2) of the top pole 27c. At the coupling point (that is, TH0 position), the width of the middle area 27a(2) is W1, and that of the top pole 27a(1) is W2 which is narrower than W1. That is, at TH0 position or its vicinity, there is a step in the width direction between the middle area 27a(2) and the top area 27a(1). The step face 21 of the middle area 27a(2) at the step makes an angle γ1 with the side face of the middle area 27a(2) and makes an angle δ with the side face of the top area 27a(1). In the embodiment, both angles γ1 and δ are almost 90 degrees. That is, both the middle area 27a(2) and the top area 27a(1) takes a shape of rectangle and the step face 21 is substantially orthogonal to the side face of the top area 27a(1). Here, the top area 27a(1) corresponds to a 'first magnetic layer portion' of the invention, and the middle area 27a(2) corresponds to a 'second magnetic layer portion' of the invention.

As evident in FIGS. 18 to 20, the top area 27a(1) is extending on the flat write gap layer 9, and the middle area 27a(2) is located on the insulating pattern 25.

The values as follows, for example, are preferable as the size of each part shown in FIG. 20.
Width W1 of the middle area 27a(2)=2.0 to 5.0 μm
Length L4 of the middle area 27a(2)=1.0 to 5.0 μm
Width W2 of the top area 27a(1)=0.4 to 1.2 μm
Width W3 of the yolk area 17a=30 to 40 μm
Length of the connecting area 27c(2)=3.0 to 5.0 μm The thin-film magnetic head with the top pole having a shape described above exhibits a high performance in overwrite characteristic for the same reasons as the first embodiment. Further, the magnetic head with the top pole 27c and the top pole tip 27a having shapes as described above has same advantages as the first embodiment in the manufacturing process.

That is, according to the thin-film magnetic head of the embodiment, widening of the pattern width of the photoresist for forming the top area 27a(1) of the top pole tip 27a can be prevented. As a result, the writing track width assume smaller and, at the same time, a sufficient overwrite character can be maintained by suppressing the magnetic flux occurred in the yolk area 27c(1) to be saturated before reaching the top area 27a(1) of the top pole tip 27a.

Further, in the embodiment, forming the photoresist pattern by photolithography can be performed with high precision since the top pole 27c can be formed on a surface which has been flattened by CMP.

Further, in the embodiment, a thick insulating film 28 made of such as alumina is formed between the write gap layer 9 and the thin-film coil 10 so that an dielectric withstand voltage between the thin-film coil 10 and the bottom electrode 7 can be increased and, at the same time, leakage of the magnetic flux from the thin-film coil 10 can be decreased.

Figure 22:
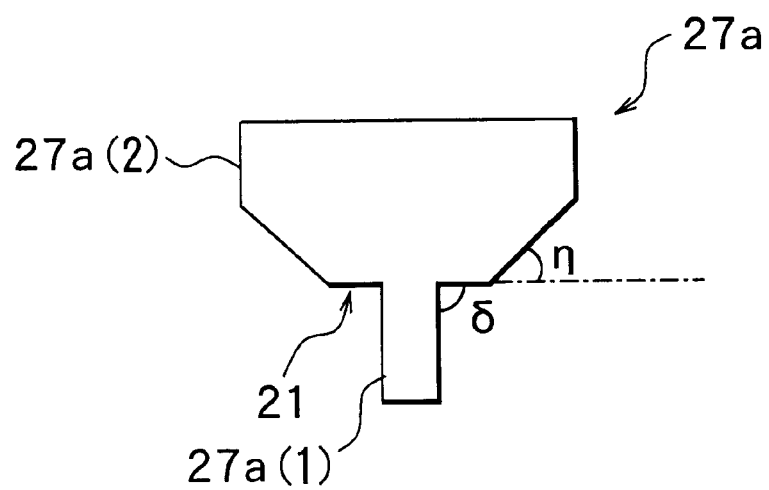
FIG. 22 is a plan view showing a modification of a top pole tip shown in FIG. 21.
Figure 23:
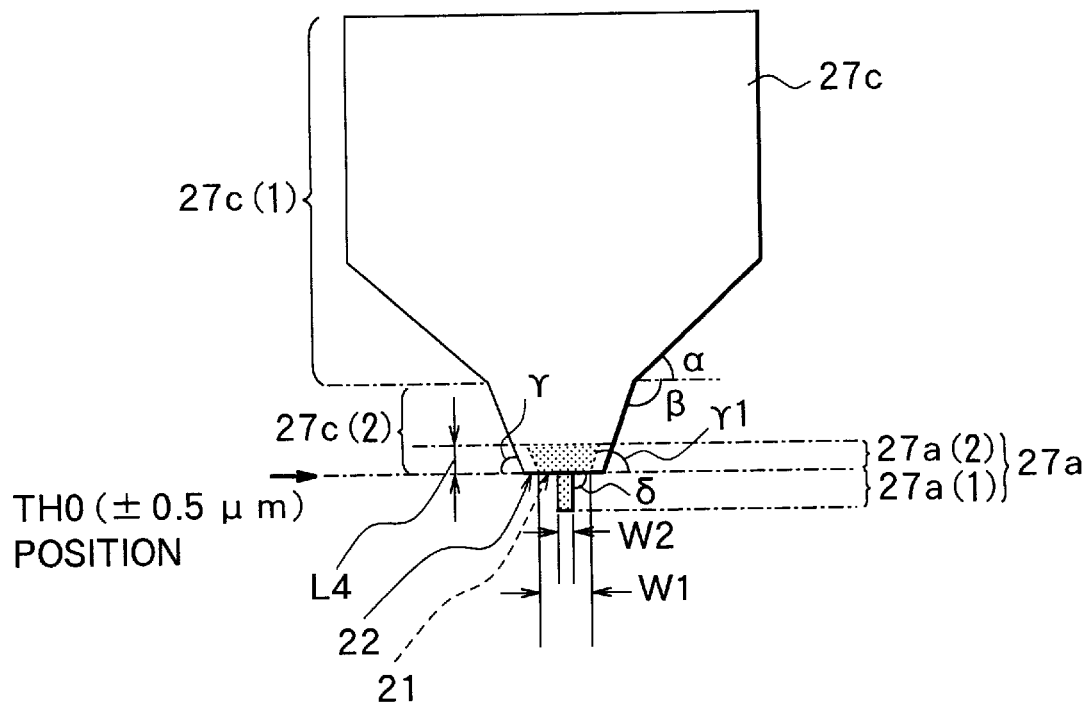
FIG. 23 is a plan view showing a modification of the top pole and the top pole tip shown in FIG. 20.
Figure 24:
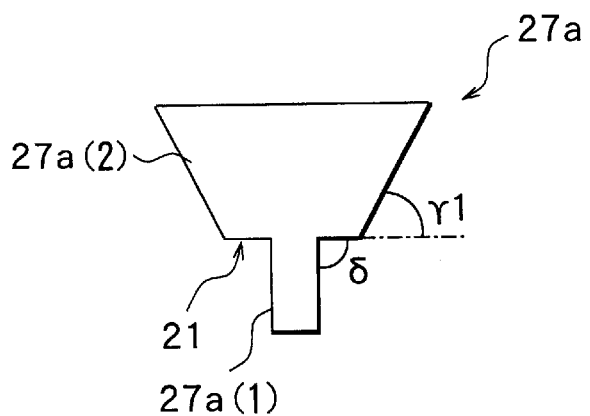
FIG. 24 is plan view showing an enlarged plan structure of the top pole tip shown in FIG. 23.

The top pole 27c and the top pole tip 27a are not limited to the shapes shown in FIGS. 20 and 21 but may take the shapes shown in FIGS. 22 to 24, for example.

FIG. 22 is a plan view of the top pole tip 27a of which both outer corners of the step face 21 of the middle area 27a(2) are rounded off. The structure except for the area which is rounded off is identical to that of FIG. 21. The rounded angle 7 of the step face 21 is preferred to be 30 to 60 degrees, for example.

FIG. 23 illustrates a plan structure in which the connecting area 27c(2) of the top pole 27c and the middle area 27a(2) of the top pole tip 27a have tapered shape, and FIG. 24 illustrates a plan structure of the top pole tip 27a. In these figures, the taper angle γ of the connecting area 27c(2) of the top pole 27c is set in a range of, for example, 45 to 60 degrees, against the edge face 22 of the connecting area 27c(2), the taper angle γ 1 of the middle area 27a(2) of the top pole tip 27a is preferred to be set in a range of, for example, 60 to 80 degrees, against the step face 21.

With the thin-film magnetic head having the top pole 27c and the top pole tip 27a shown in FIGS. 22 to 24, the same effect as the thin-film magnetic head having the top pole 27c and the top pole tip 27a shown in FIG. 20 can be obtained.

Figure 25:
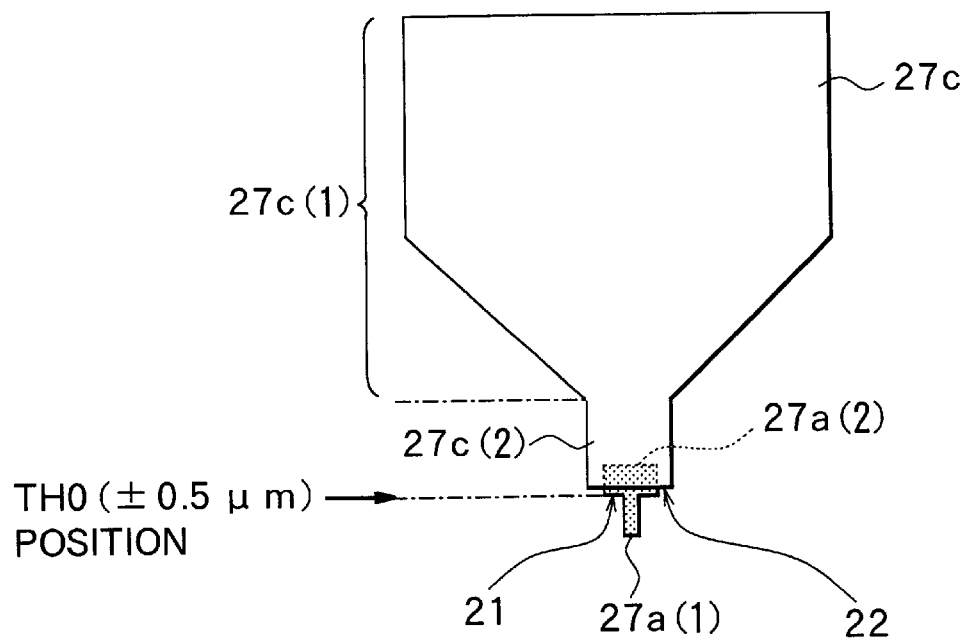
FIG. 25 is a plan view showing another modification of the top pole and the top pole tip shown in FIG. 20.

The position of the edge face 22 in front (air bearing side) of the connecting area 27c(2) of the top pole 27c does not necessarily be met exactly with the step face 21 of the top pole tip 27a which is met with TH0 position. For example, as shown in FIG. 25, the position of the edge face 22 of the connecting area 27c(2) may be shifted to the back (opposite of the air bearing surface) of the position of the step face 21.

Figure 26:
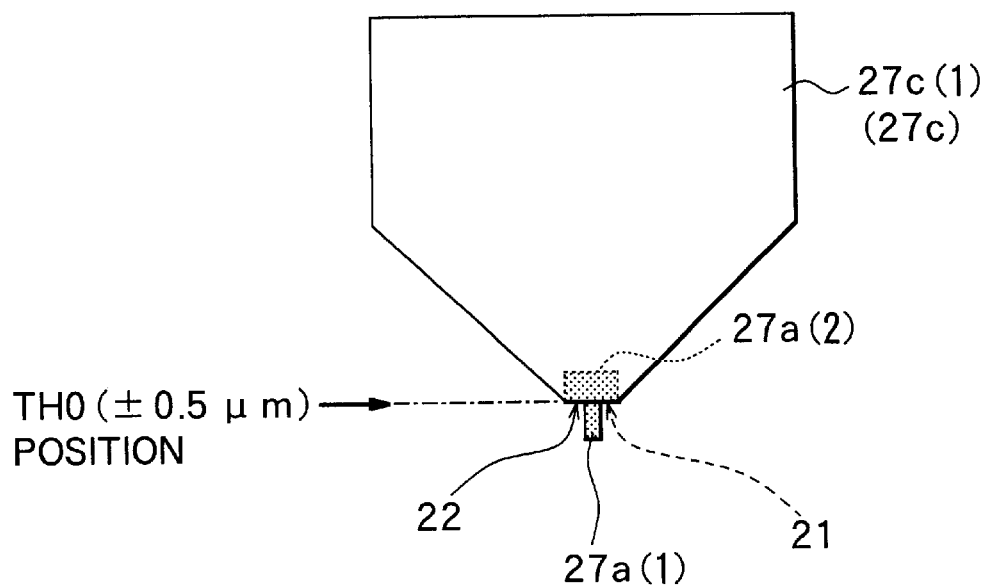
FIG. 26 is a plan view showing modifications of the top pole and the top pole tip of the thin-film magnetic head of the invention.
Figure 27:
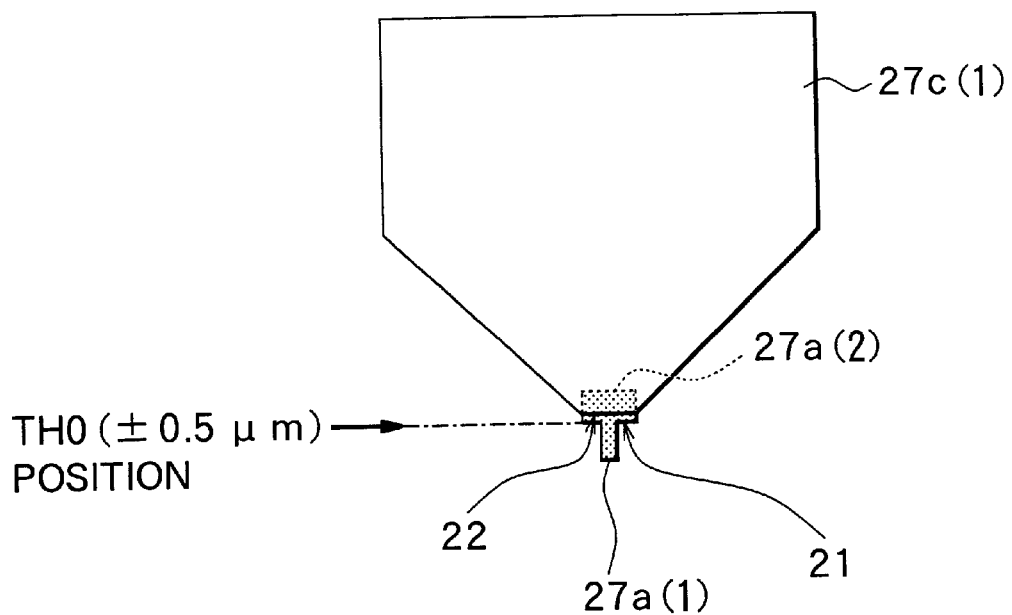
FIG. 27 is a plan view showing another modification of the top pole and the top pole tip of the thin-film magnetic head of the invention.

Further, the connecting area 27c(2) of the top pole 27c in the second embodiment (FIG. 20) is not essential. For example, as shown in FIG. 26, the top pole 27c may be composed only of the yolk area 27c(1), and some portion of the yolk area 27c(1) may be overlapped on the middle area 27a(2) of the top pole tip 27a. In such a case, the position of the edge face 22 in front (air bearing side) of the yolk area 27c(1) does not necessarily be met exactly with the position of the step face 21 of the top pole tip 27a which is met with TH0 position. For example, as shown in FIG. 27, the position of the edge face 22 in front of the yolk area 27c(1) may be shifted to the back (opposite of the air bearing surface) of the position of the step face 21 of the top pole tip 27a.

Third Embodiment

A third embodiment of the invention will be described in the followings.

Figure 28:
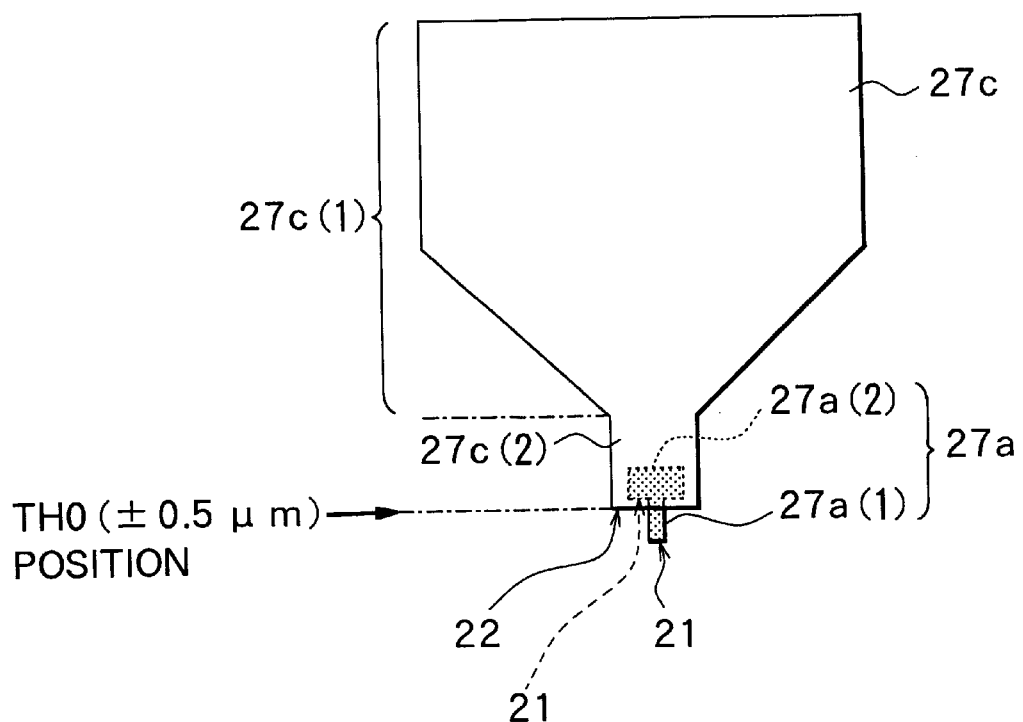
FIG. 28 is a plan view showing a plan structure of the top pole and the top pole tip of the thin-film magnetic head according to a third embodiment.
Figure 29:
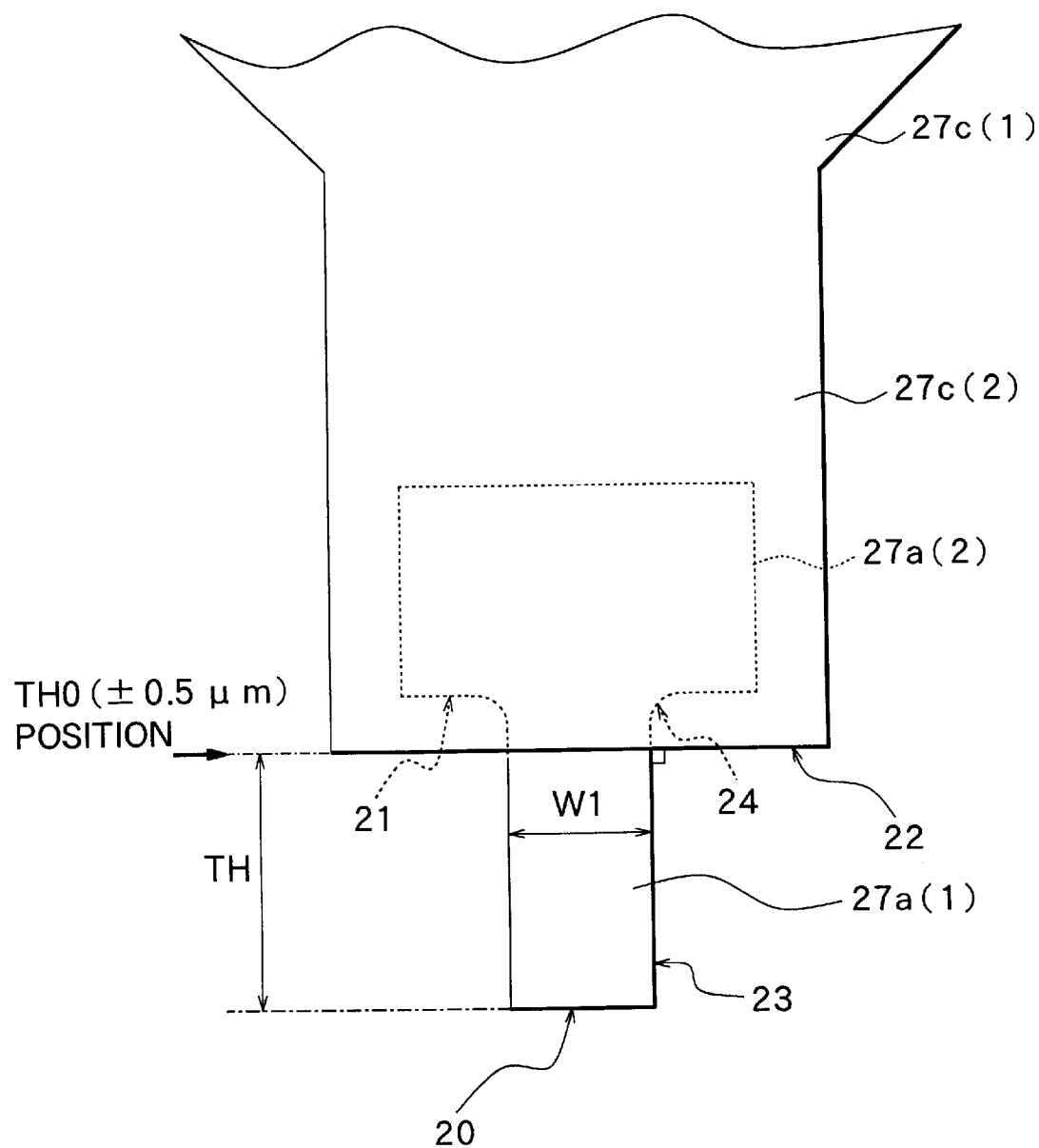
FIG. 29 is a magnified plan view of a main portion of the top pole and the top pole tip shown in FIG. 28.

FIG. 28 illustrates a plan structure of the top pole 27c and the top pole tip 27a in the third embodiment of the invention and FIG. 29 shows the main part of FIG. 28 being enlarged. In these figures, like numerals are adopted to the elements which are identical to those shown in FIG. 20 in the second embodiment, and description will be omitted when not necessary.

As shown in FIGS. 28 and 29, in the embodiment, the connecting area 27c(2) of the top pole 27c is extending to overlap a portion of the top area 27a(1) in such a manner that the edge face 22 thereof goes over the position of the step face 21 of the top pole tip 27a. The edge face 22 of the connecting area 27c(2) in the overlapping area is orthogonal to the extending direction of the top area 27a(1), that is, to the direction of the side face 23 of the top area 27a(1). Further, in the embodiment, TH0 position is met with the position of the edge face 22 of the connecting area 27c(2) but not the position of the step face 21 of the top pole tip 27a. Other structures and the manufacturing method are identical to those of the second embodiment. For example, the cross sectional structure taken along the face orthogonal to the air bearing surface 20 going through the top area 27a(1) is identical with the one shown in FIGS. 18 or 19.

As described with reference to FIG. 18, the photolithography procedure for forming the top pole tip 27a and the photolithography procedure for forming the top pole 27c are performed separately. As a result, even if the corner of the photoresist is rounded due to a poor condition of exposure during the photolithography procedure for forming the top pole tip 27a so that the crossing part 24 formed by the step face 21 of the top pole tip 27a and the side face 23 of the top area 27a(1) does not assume a corner with a sharp right angle, that is, the crossing part 24 is rounded off, as shown in FIG. 29, the side face 23 of the top area 27a(1) and the connecting area 27c(2) of the top pole 27c invariably makes a sharp right angle. That is, the width of the top area 27a(1) for defining the track width of the recording medium is made to be W1 precisely through the whole region from TH0 position to the air bearing surface (i.e. whole region of throat height TH). Accordingly, in a case where the width W1 of the top area 27a(1) is made less than 1 μm or, further, less than 0.5 μm in accordance with narrowing of the track width, the width W1 of the top area 27a(1) is not widened at TH0 position or in the vicinity of TH0 position. Especially, even in a case where the value of the throat height TH is reduced from the value of about 1 μm to the value of 0.5 to 0.2 μm to obtain the thin-film magnetic head with higher performance, a precise design value width W1 can be guaranteed all through the region of the throat height TH. As a result, the recording track width on the recording medium can be controlled precisely, and a sidewrite phenomenon in which a data to be written on a specific track is written on a neighboring track can be effectively prevented.

Further, in the embodiment, the connecting area 27c(2) which spreads in the width direction of the top area 27a(1) is being placed immediately behind TH0 position of the top area 27a(1) and, at the same time, the middle area 27a(2) is being placed immediately behind the step face 21, so that a sufficient magnetic volume is maintained. As a result, saturation of the magnetic flux occurred in the yolk area 27c(i) before reaching the top area 27a(1) of the top pole tip 27a can be effectively prevented, and a sufficient overwrite characteristic can be maintained.

Figure 30:
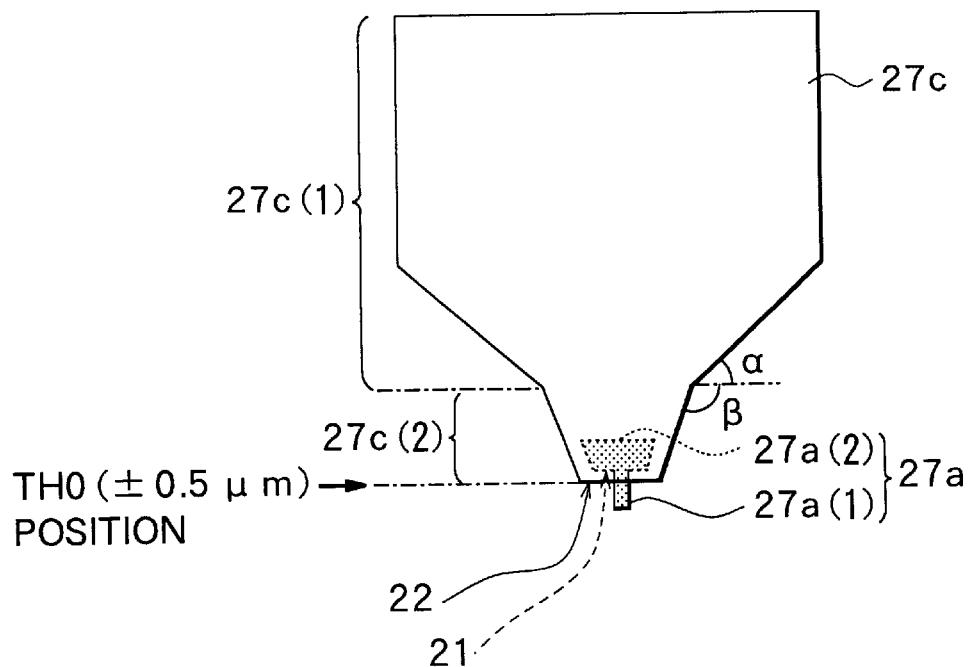
FIG. 30 is a plan view showing a modification of the top pole and the top pole tip of the thin-film magnetic head according to the third embodiment.

In a case where the edge face 22 of the connecting area 27c(2) of the top pole 27c is placed in a position over the step face 21 of the top pole tip 27a like the embodiment, the shape of the top pole tip 27a and the top pole 27c are not limited to the ones shown in FIG. 28. As shown in FIG. 30, for example, the connecting area 27c(2) of the top pole 27c and the middle area 27a(2) of the top pole tip 27a may take the shapes with taper, respectively. The taper angle of the connecting area 27c(2) of the top pole 27c and the taper angle of the middle area 27a(2) of the top pole tip 27a are preferred to be made same as in the case of FIG. 23.

Figure 31:
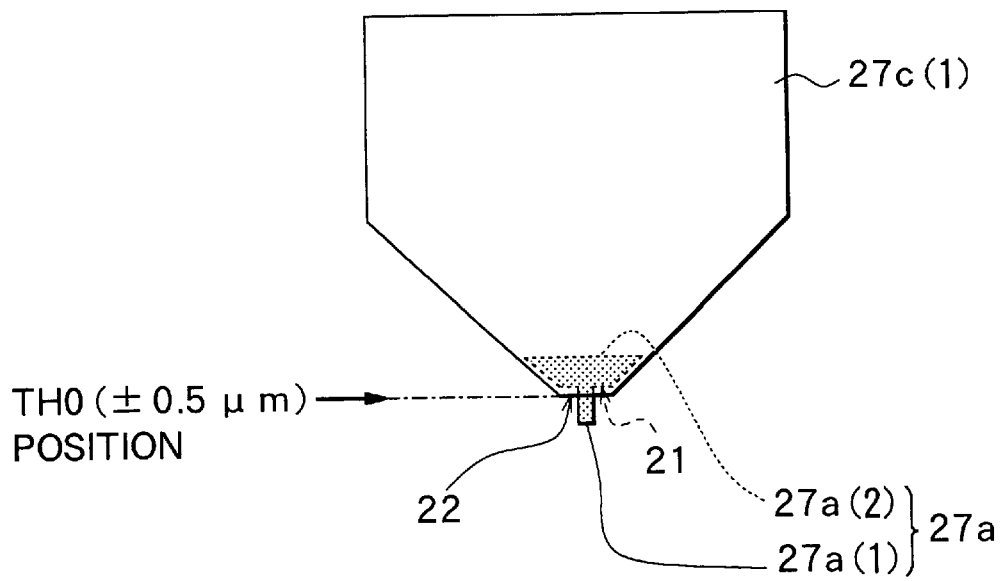
FIG. 31 is a plan view showing another modification of the top pole and the top pole tip of the thin-film magnetic head according to the third embodiment.

Further, as shown in FIG. 31, the top pole 27c can be composed only of the yolk area 27c(1) without the connecting area 27c(2) and the yolk area 27c(1) may be overlapped so that the end frame face 22 of the yolk area 27c(1) is placed on the top area 27a(1) going over the step face 21 of the top pole tip 27a.

Figure 32:
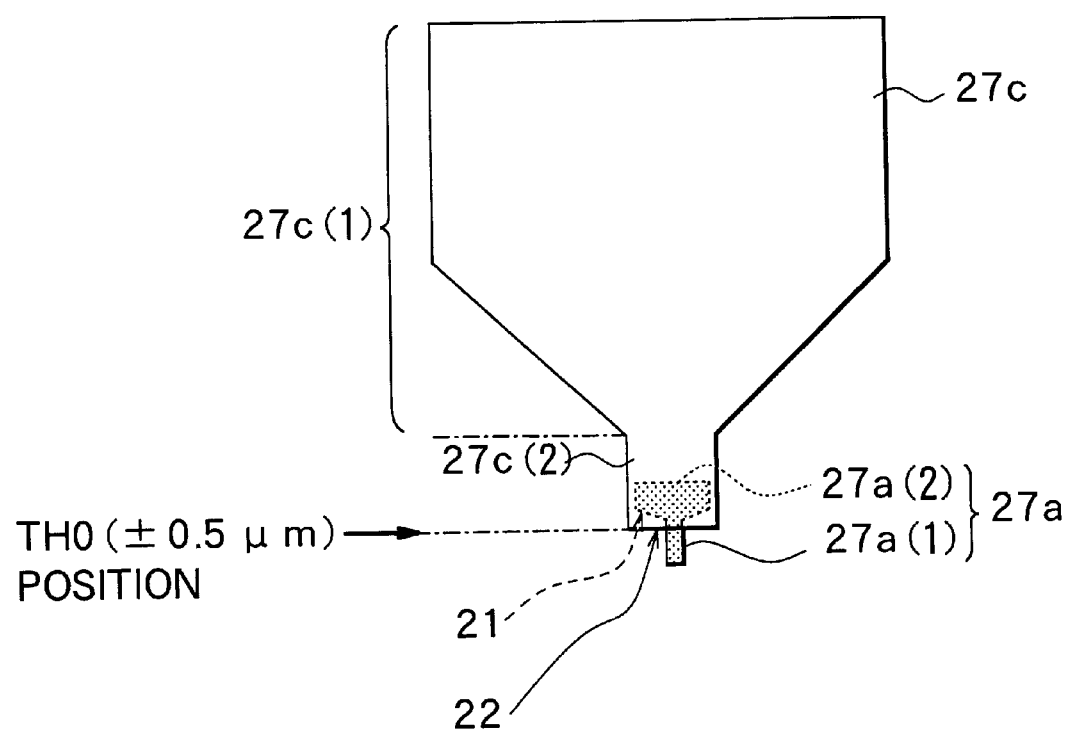
FIG. 32 is a plan view showing still another modification of the top pole and the top pole tip of the thin-film magnetic head according to the third embodiment.

Further, as shown in FIG. 32, the step face 21 of the top pole tip 27a and the side face 23 of the top area 27a(1) may make an angle larger than 90 degrees. However, it is preferable to make the angle 90 degrees between the step face 21 and the side face 23.

In the second and third embodiment, a case in which the top pole are a of the thin-film magnetic head is formed being divided into two parts such as the top pole 27c and the top pole tip 27a and, at the same time, the whole thin-film magnetic head has a cross sectional structure as shown in FIG. 19, however, the invention is not limited to the embodiment. The structures in a fourth and fifth embodiments described in the followings may also be applicable.

Fourth Embodiment

Next, a method of manufacturing a composite thin-film magnetic head as a method of manufacturing the thin-film magnetic head of the fourth embodiment of the invention will be described with reference to FIG. 33A and FIG. 33B to FIG. 35A and FIG. 35B. The thin-film magnetic head of the invention is specified in the method of manufacturing of the thin-film magnetic head of the embodiment so that both together be described in the followings. Each of FIG. 33A to FIG. 35A shows a cross sectional view orthogonal to the air bearing surface and each of FIG. 33B to FIG. 35B shows a cross sectional view parallel to the air bearing surface of the pole area. In these figures, like numerals are adopted to the elements which are identical to those of the forgoing embodiments respectively.

Figures 33A, 33B:
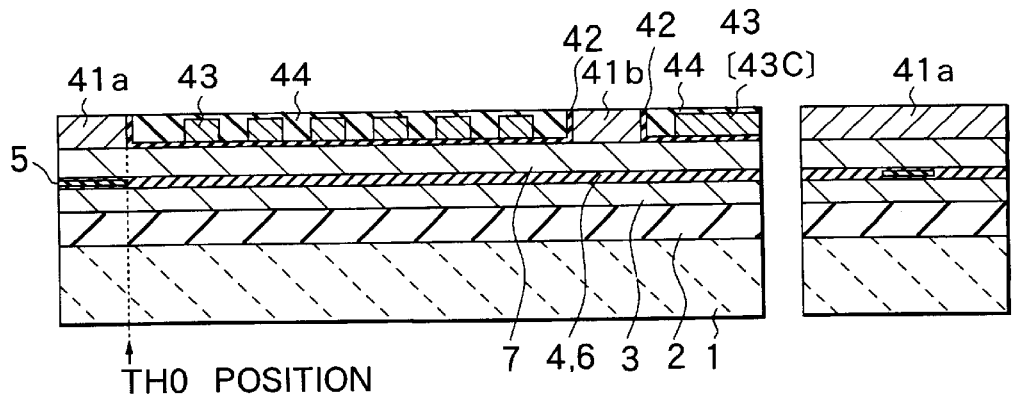
FIG. 33A and FIG. 33B are cross sectional views for describing a procedure of the method of manufacturing of thin-film magnetic head according to a fourth embodiment.

In the method of manufacturing the thin-film magnetic head, a description of the procedure until forming the bottom pole 7 shown in FIG. 33A and FIG. 33B is omitted since it is identical to the procedure shown in FIG. 1A and FIG. 1B to part of FIG. 3A and FIG. 3B of the first embodiment.

In the embodiment, after forming the bottom electrode 7, a bottom pole tip 41a and a bottom connecting area 41b of about 2.0 to 2.5 $\mu$m in thickness are formed on the bottom electrode 7 as shown in FIG. 33A and FIG. 33B. Here, the bottom pole tip 41a is formed to be extended from the area near the air bearing surface (i.e. the vicinity of an MR (GMR) height 0 position) to the throat height 0 position. The bottom pole tip 41a and the bottom connecting area 41b may be formed as a plated film such as NiFe, or as a sputtered film such as FeN, FeZrNP, or CoFeN.

Next, an insulating film 42 of 0.3 to 0.6 $\mu$m in thickness made of an insulating material such as alumina is formed all over the surface by, for example, sputtering method or CVD) method.

Next, a first thin-film coil 43 of 1.5 to 2.5 $\mu$m in thickness made of such as copper (Cu) for an inductive recording head is formed in a concave region formed between the bottom pole tip 41a and the bottom connecting area 41b by, for example, electroplating. Here, at the same time, a coil connecting area 43C for connecting the thin-film coil 43 and a second layer of thin-film coil which will be described in the following is formed in a back region (right-hand side region in the figure) of the bottom connecting area 41b.

Next, an insulating film 44 of 3.0 to 4.0 $\mu$m in thickness made of an insulating material such as alumina is formed all over the surface by sputtering method, then, the surface thereof is flatten by, for example, CMP method to have the top surface of the bottom pole tip 41a and the bottom connecting area 41b exposed.

Figures 34A, 34B:
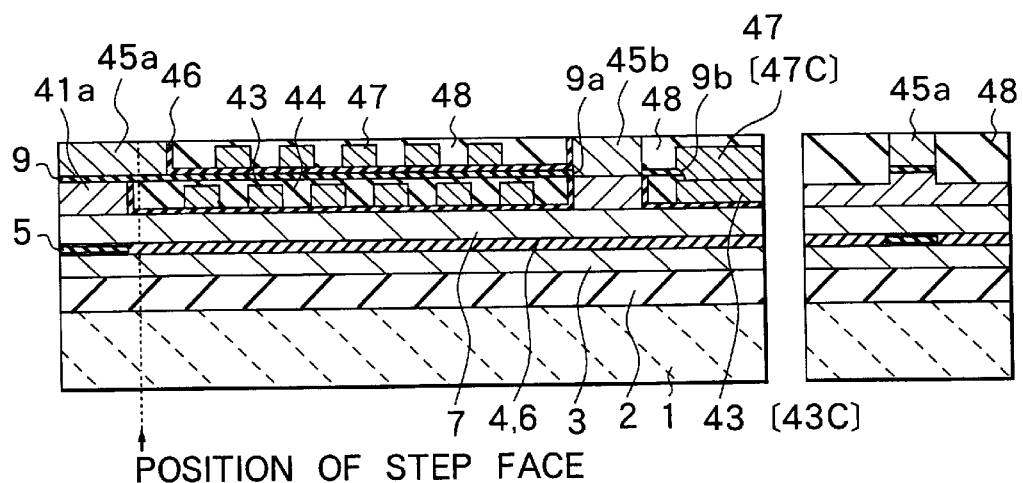
FIG. 34A and FIG. 34B are cross sectional views following FIG. 33.A

Next, as shown in FIG. 34A and FIG. 34B, a write gap layer 9 of 0.2 to 0.3 $\mu$m in thickness made of, for example, an alumina insulating material is formed by sputtering method. The write gap layer 9 may be formed with materials such as aluminum nitride (AlN), silicon oxide, and silicon nitride other than alumina. An opening 9a for connecting the top pole and the bottom pole is formed by patterning the write gap layer 9 through photolithography and, at the same time, an opening 9b to exposure the coil connecting area 43C is formed by patterning the write gap layer 9 and the insulating layer 44.

Further, a top pole tip 45a is formed on the write gap layer 9, and a top connecting area 45b for magnetically coupling the top pole and the bottom pole is formed so as to overlap with the bottom connecting area 41b and to have a contact therewith. On the other hand, the top pole tip 45a is formed extending longer than the bottom pole tip 41a in a backward direction from the air bearing surface. The top pole tip 45a is formed, like the third embodiment (shown in such as FIG. 28), having the middle area 27a(2) for maintaining a magnetic volume, the top area 27a(1) for defining the track width and the step face 21 at the coupling point. The plan shape of top pole tip 45a is same as that shown in FIGS. 28, 30, 31, or 32. Further, the top pole tip 45a is to be placed so that the step face 21 is located in a position slightly backward of the edge face position (that is, TH0 position) which is in the back side of the bottom pole tip 41a.

Further, the write gap layer 9 and the bottom pole tip 41a are etched in a self-aligned manner using the top pole tip 45a as a mask. That is, after selectively removing the write gap layer 9 through RIE by chlorine system gas (Cl$_2$, CF$_4$, BCl$_2$, SF$_6$, and so on), using the top pole tip 45a as a mask, a trim structure is formed by further etching the exposed bottom pole tip 41a about 0.3 to 0.6 $\mu$m by, for example, ion milling with Ar.

Further, an insulating layer 46 of 0.3 to 0.6 in thickness made of such as alumina is formed all over the surface by, for example, sputtering method or CVD method. Next, a second layer of thin-film coil 47 of 1.5 to 2.5 $\mu$m in thickness made of copper (Cu) for an inductive recording head is formed by, for example, electroplating on the insulating film 46 in the concave area formed between the top pole tip 45a and the top connecting area 45b. Here, at the same time, the coil connecting area 47C which has a contact with the coil connecting area 43C through the opening area 9b is formed.

Further, an insulating layer 48 of about 3 to 4 $\mu$m in thickness made of such as alumina is formed all over the surface by, for example, sputtering method or CVD method. The insulating layer 48 and the insulating film 46 may be formed with insulating materials, other than alumina, such as silicon dioxide (SiO$_2$) and silicon nitride (SiN).

Next, polishing is performed by, for example, CMP method so that the top surface of the top pole tip 45a and the top connecting area 45b is exposed. As a result, the surface of the top pole tip 45a and the top connecting area 45b is flattened so as to have a same surface level as that of the insulating layer 48 and the insulating firm 46.

Figures 35A, 35B:
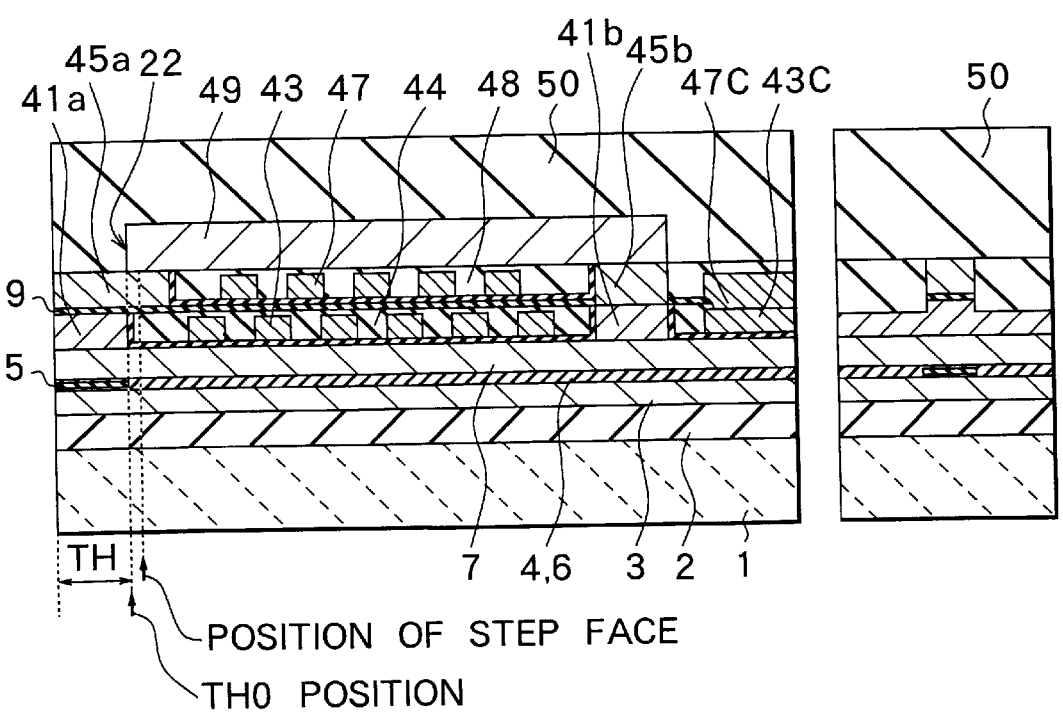

Next, as shown in FIG. 35A and FIG. 35B, a top pole 49 of about 3 to 4 μm in thickness made of, for example, the same material with the top pole tip 45a is selectively formed by, for example, electroplating or sputtering method. Here, some portion of the top pole 49 overlaps with the top pole tip 45a and a position of the edge face 22 which is in the front side (air bearing surface side) of the top pole 49 is placed to meet the position of the back-side edge (that is, TH0 position) of the bottom pole tip 41a. Further, the back-side edge position of the top pole 49 is placed being in touch with the top connecting area 45b. As a result, the top pole 49 is magnetically connected to the top pole tip 45a and, at the same time, magnetically connected to the bottom pole 7 through the top connecting area 45b and the bottom connecting area 41b.

Further, an overcoat layer 50 of about 30 μm in thickness made of such as alumina is formed all over the surface by, for example, sputtering. Then, the thin-film magnetic head is completed by forming the air bearing surface (ABS) of the recording head and the reproducing head through applying slider machining process.

In the embodiment, the top pole 49 is formed with the position of the front-side edge face 22 being at TH0 position and, at the same time, being in forward position of the step face 21 of the top pole tip 45a. As a result, such an effect as that of the third embodiment as shown in FIG. 29 can be obtained.

Fifth Embodiment

A method of manufacturing a composite thin-film magnetic head as the method of manufacturing the thin-film magnetic head according to a fifth embodiment of the invention will be described with reference to FIG. 36A to FIG. 38B. The thin-film magnetic head of the invention is specified in the method of manufacturing the thin-film magnetic head of the embodiment so that both together be described in the followings. Each of FIG. 36A to FIG. 38A shows a cross sectional view orthogonal to the air bearing surface and each of FIG. 36B to FIG. 38B shows a cross sectional view parallel to the air bearing surface of the pole area. In these figures, like numerals are adopted to the elements which are identical to those of the forgoing embodiments respectively.

In the method of manufacturing the thin-film magnetic head, a description of the procedure until forming the bottom pole 7 as shown in FIG. 36A and FIG. 36B is omitted since it is identical to the procedure shown in FIG. 1A and FIG. 1B to part of FIG. 3A and FIG. 3B of the first embodiment.

In the embodiment, after forming the bottom electrode 7, a bottom pole tip 61a and a bottom connecting area 61b are formed on the bottom electrode 7 as shown in FIG. 36A and FIG. 36B. Here, the bottom pole tip 41a is formed to be extended from the area near the air bearing surface (i.e. the vicinity of an MR (GMR) height 0 position) to the throat height 0 position.

Next, an insulating film 62 of 3.0 to 4.0 μm in thickness made of an insulating material such as alumina is formed all over the surface by sputtering method, then, flatten all of the surface by, for example, CMP method to have the top surface of the bottom pole tip 61a and the bottom connecting area 61b exposed.

Next, as shown in FIG. 37A and FIG. 37B, the write gap layer 9 of 0.2 to 0.3 μm in thickness made of, for example, an alumina insulating material is formed by sputtering method. The opening 9a for connecting the top pole and the bottom pole is formed by patterning the write gap layer 9 through photolithography.

Next, a top pole tip 63a is formed on the write gap layer 9, and a top connecting area 63b for magnetically coupling the top pole and the bottom pole is formed so as to overlap with the bottom connecting area 61b and to have a contact therewith. On the other hand, the top pole tip 63a is formed extending longer than the bottom pole tip 61a in a backward direction from the air bearing surface. The top pole tip 63a is formed, like the third embodiment (shown in such as FIG. 28), having the middle area 27a(2) for maintaining a magnetic volume, the top area 27a(1) for defining the track width and the step face 21 at the coupling point. The plan shape of top pole tip 63a is same as that shown in FIGS. 28, 30, 31, or 32. Further, the top pole tip 63a is to be placed so that the step face 21 is located in a position slightly backward of the edge face position (that is, TH0 position) which is in the back side of the bottom pole tip 61a.

Further, a trim structure is formed by etching the write gap layer 9 and the bottom pole tip 61a in a self-aligned manner using the top pole tip 63a as a mask.

Next, a first layer of thin-film coil 64 of 1.5 to 2.5 μm in thickness made of copper (Cu) for an inductive recording head is formed by, for example, electroplating on the write gap layer 9 in the concave area formed between the top pole tip 63a and the top connecting area 63b. Here, at the same time, the coil connecting area 64C for coupling the thin-film coil 64 and a second layer of thin-film coil which will be described in the following is formed in a back region (right-hand side region in the figure) of the top connecting area 63b.

Figures 38A, 38B:
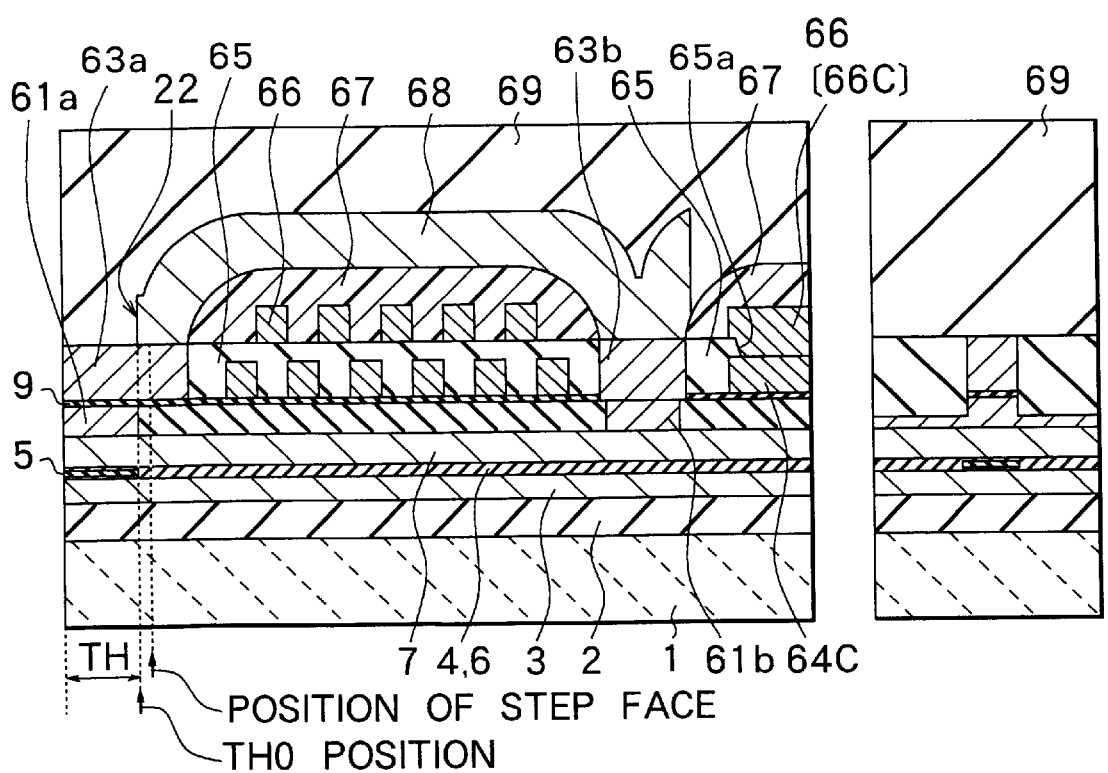
FIG. 38A and FIG. 38B are cross sectional views following FIG. 37A and FIG. 37B.
Figure 39:
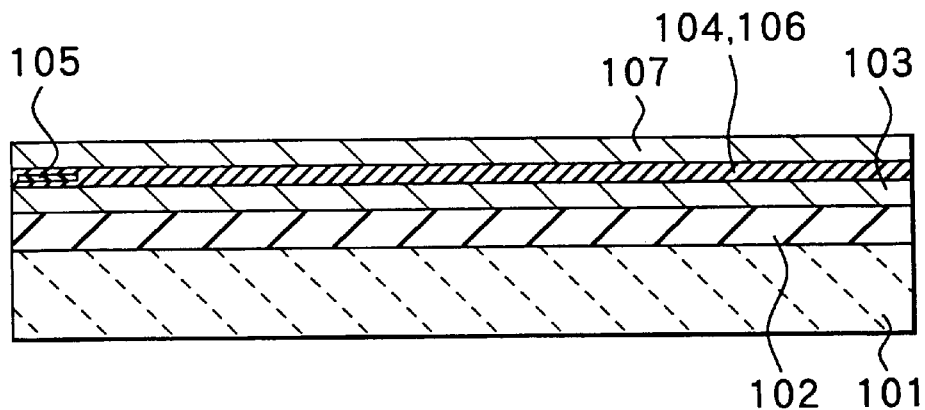
FIG. 39 is a cross sectional view for describing a procedure of a method of manufacturing thin-film magnetic head of a related art.
Figure 40:
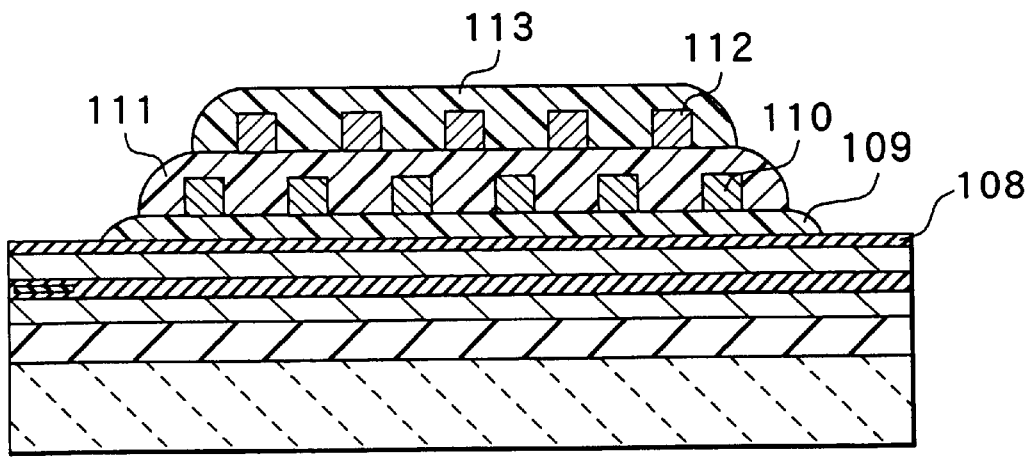
FIG. 40 is a cross sectional view for describing the procedure following FIG. 39.
Figure 41:
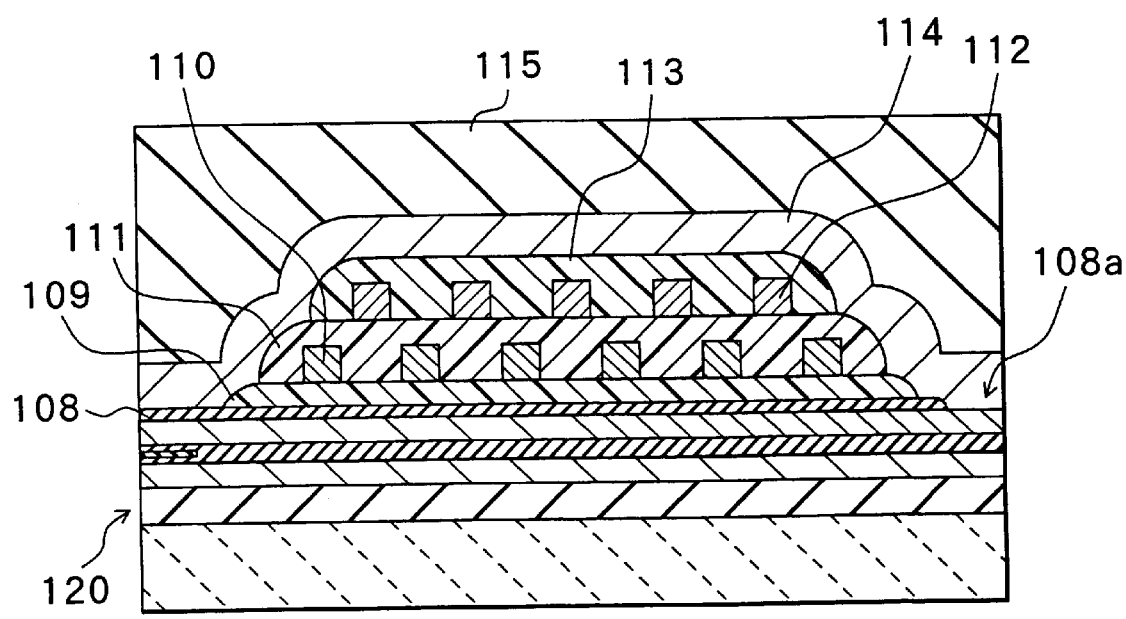
FIG. 41 is a cross sectional view for describing the procedure following FIG. 40.
Figure 42:
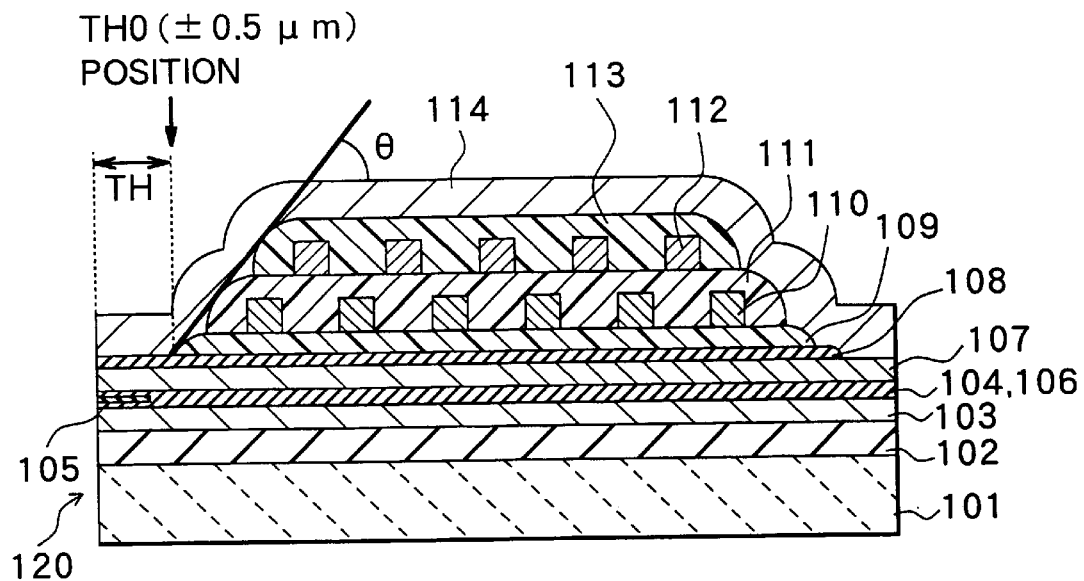
FIG. 42 is a cross sectional view illustrating the structure of the conventional thin-film magnetic head.
Figure 43:
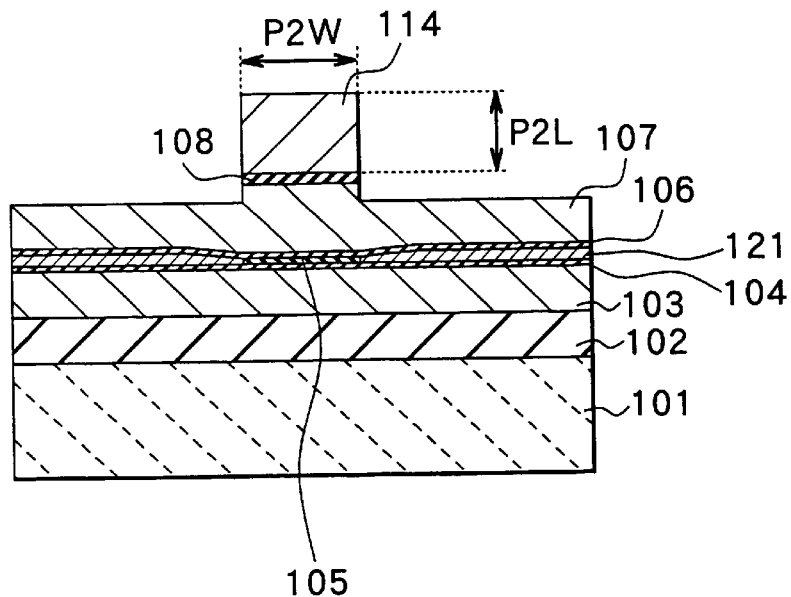
FIG. 43 is a cross sectional view showing a cross section parallel to an air bearing surface in the conventional thin-film magnetic head.
Figure 44:
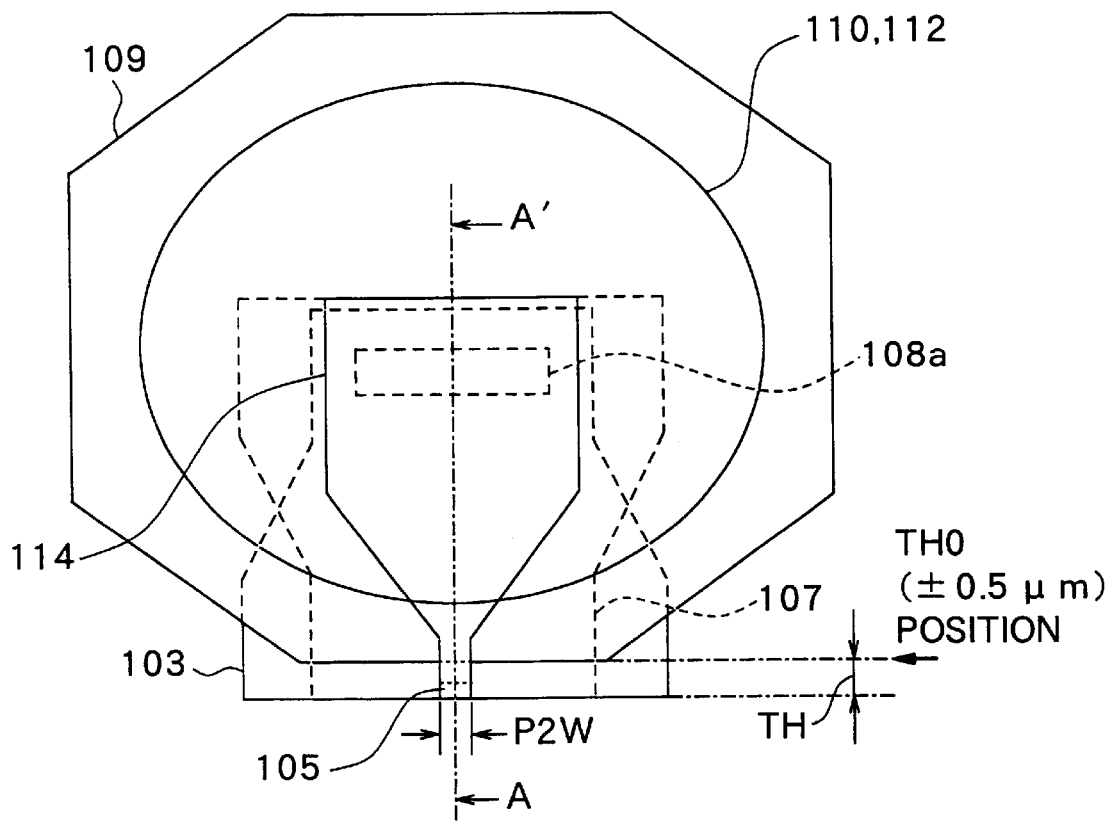
FIG. 44 is a plan view showing the structure of the conventional thin-film magnetic head.

Next, as shown in FIG. 38A and FIG. 38B, an insulating film 65 of 3.0 to 4.0 μm in thickness made of an insulating material such as alumina is formed all over the surface by sputtering method, then, the surface thereof is flattened by, for example, CMP method to have the top surface of the bottom pole tip 63a and the bottom connecting area 63b exposed.

Next, an opening 65a reaching the coil connecting area 64C is formed by selectively etching the insulating layer 65.

Next, a second layer of a thin-film coil 66 of 1.5 to 2.5 μm in thickness made of such as copper (Cu) for an inductive recording head is formed on the insulating layer 65 by, for example, electroplating. Here, at the same time, a coil connecting area 66C having a contact with the connecting area 64C through the opening 65a is formed.

Next, a photoresist layer 67 covering the thin-film coil 66 and the coil connecting area 64C is formed by photolithography with high precision, then, a heat treatment at 250° C. is applied to have the surface of the photoresist layer 67 flattened and turn of the thin-film coil 66 insulated to each other.

Next, a top pole 68 of about 3 to 4 μm in thickness made of, for example, the same material with the top pole tip 63a is selectively formed by, for example, electroplating or sputtering method. Here, a portion of the top pole 68 overlaps with the top pole tip 63a and a position of the edge face 22 which is in the front side (air bearing surface side) of the top pole 68 is placed to meet the position of the back-side edge (that is, TH0 position) of the bottom pole tip 61a. Further, the back-side edge position of the top pole 68 is placed being in touch with the top connecting area 63b. As a result, the top pole 68 is magnetically coupled to the top pole tip 63a and, at the same time, magnetically coupled to the bottom pole 7 through the top connecting area 63b and the bottom connecting area 61b.

Further, an overcoat layer 69 of about 30 μm in thickness made of such as alumina is formed all over the surface by, for example, sputtering. Then, the thin-film magnetic head is completed by forming the air bearing surface (ABS) of the recording head and the reproducing head through applying a slider machining process.

With the embodiment, same operation and effect as the third and fourth embodiments can be obtained. That is, a sidewrite phenomenon can be effectively prevented by precisely controlling the recording track width on the recording medium and, at the same time, a sufficient overwrite characteristic can be maintained.

Further, in the embodiment, the top pole tip 63a can be formed on a flattened area so that a photoresist pattern can be formed by photolithography with high precision. As a result, a width of the top area 27a(1) of the top pole tip 63a can be micronized as precise as 0.5 to 0.25 μm.

The invention has been described in the forgoing embodiments, however, it is not limited to the embodiments but may be practiced still other way with modifications. For example, the method of manufacturing the composite thin-film magnetic head is described in the forgoing embodiments and the modification examples, however, the invention may be applied to a thin-film magnetic head for recording only or a thin-film magnetic head for recording and reproducing, having an induction magnetic transducer for writing. The invention may be applied to a thin-film magnetic head in which an element for writing and an element for reading are stacked in a reverse order.

As described above, according to the thin-film magnetic head and the method of manufacturing the same of the invention, at least one of the two magnetic layers include a first magnetic layer portion with a constant width for defining a width of a recording track of a recording medium extending from a recording medium opposite surface facing to the recording medium to an edge of the insulating layer closer to the recording medium or its vicinity; and a second magnetic layer portion magnetically coupled to the first magnetic layer portion at the edge of the insulating layer or its vicinity. A step in the width direction is formed in a coupling point of the first magnetic layer portion and the second magnetic layer portion so as to have a width of the first magnetic layer portion at the coupling point smaller than a width of the second magnetic layer portion at the coupling point. Accordingly, an influence of an unnecessary reflection from the undercoat layer in the photolithography procedure of forming the first magnetic layer portion can be suppressed so as to have the width of the first magnetic layer formed precisely and, at the same time, a magnetic flux occurred through thin-film coils is prevented from being saturated in the second magnetic layer portion before reaching the first magnetic layer portion. As a result, the width of the first magnetic layer portion can be micronized to, for example, sub-microns and, at the same time, an effect of maintaining an sufficient overwrite characteristic can be obtained.

According to other thin-film magnetic head and the method of manufacturing the same, a step face of the second magnetic layer portion at the coupling point is substantially orthgonal to the extending direction of the first magnetic layer portion. Accordingly, an influence of an unnecessary reflection from the undercoat layer in the photolithography procedure for forming the first magnetic layer portion is effectively suppressed, and the width of the first magnetic layer portion is more precisely formed.

Further, according to still another thin-film magnetic head or the method of manufacturing the same, the third magnetic layer portion is placed overlapping a portion of the first magnetic layer portion going over the coupling point; and an edge face of the third magnetic layer portion closer to a recording medium in the overlapping area is orthogonal to the extending direction of the first magnetic layer portion. As a result, the width of the first magnetic layer portion which determines the recording track width of the recording medium becomes exactly constant without being influenced all through the area from the orthogonally crossing point to the top area, even if a concave corner of the step of the width direction at the coupling point is rounded off. As a result, the width of the recording track of the recording medium can be precisely controlled.

Further, according to the thin-film magnetic head or the method of manufacturing the same of the invention, a position of the edge face of the third magnetic layer portion is met with a position of the edge of the insulating layer closer to a recording medium, so that the width of the first magnetic layer becomes exactly constant all through the whole range of so-called throat height, and the width of the recording track of the recording medium can be more precisely controlled.

Further, according to the thin-film magnetic head or the method of manufacturing the same of the invention, even if a bad influence of the condition of exposure in the photolithography procedure for forming the first magnetic layer occurs due to the fact that the second magnetic layer is formed on the slope, having a comparatively large rounded part in the concave corner of the step in the width direction at the coupling point, varying of the substantial width of the first magnetic layer portion can be avoided. That is, stabilizing the width of the pole for recording formed on the slope, which was difficult hitherto, can be performed.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:

a first insulating layer as a write gap layer;

a second insulating layer provided in a predetermined area on a recording medium side in contact with a surface of the first insulating layer;

first and second magnetic layers including two magnetic poles which face each other with the first insulating layer in between and are positioned to face with a recording medium, the first and second magnetic layers being magnetically coupled to each other in a back gap area on an opposite side of an air-bearing surface facing the recording medium, the first magnetic layer having a magnetic pole tip which has a uniform width portion for defining a write track width on the recording medium and extends from the air-bearing surface to a predetermined position on the second insulating layer in contact with the surfaces of the first and second insulating layers, a magnetic pole coupler located in the back gap area in contact with the second magnetic layer, and a yoke which magnetically couples the magnetic pole tip with the magnetic pole coupler;

a thin film coil located between the first and second magnetic layers;

a third insulating layer covering an inner surface of a recessed space surrounded by the first and second insulating layers, the magnetic pole tip, and the magnetic pole coupler, wherein a recording-medium-side edge of the second insulating layer defines a reference position to the air-bearing surface; and a surface of the magnetic pole tip, the surface being on a side opposite to the first insulating layer, and edge surfaces of the third insulating layer, are planarized in one plane.

2. A method of manufacturing a thin film magnetic head comprising steps of:

forming a first insulating layer as a write gap layer;

providing a second insulating layer in a predetermined area on a recording medium side in contact with a surface of the first insulating layer;

forming first and second magnetic layers to be magnetically coupled to each other in a back gap area on an opposite side of an air-bearing surface facing the recording medium, the first and second magnetic layers including two magnetic poles which face each other with the first insulating layer in between and are positioned to face with a recording medium, the first magnetic layer having a magnetic pole tip which has a uniform width portion for defining a write track width on the recording medium and extends from the air-bearing surface to a predetermined position on the second insulating layer in contact with the surfaces of the first and second insulating layers, a magnetic pole coupler located in the back gap area in contact with the second magnetic layer, and a yoke which magnetically couples the magnetic pole tip with the magnetic pole coupler;

forming a thin film coil between the first and second magnetic layers;

forming a third insulating layer to cover an inner surface of a recessed space surrounded by the first and second insulating layers, the magnetic pole tip, and the magnetic pole coupler; and planarizing a surface of the magnetic pole tip to form one plane with at least edge surfaces of the third insulating layer, the surface of the magnetic pole tip being on a side opposite to the first insulating layer, wherein the second insulating layer is formed so that a recording-medium-side edge of the second insulating layer defines a reference position to the air-bearing surface in the step of forming the second insulating layer.

3. A thin film magnetic head comprising:

a write gap layer made of non-magnetic material;

a reference layer made of non-magnetic material selectively provided in a predetermined area on a recording medium side in contact with a surface of the write gap layer;

first and second magnetic layers including two magnetic poles which face each other with the write gap layer in between and are positioned to face with a recording medium, the first and second magnetic layers being magnetically coupled to each other in a back gap area on an opposite side of an air-bearing surface facing the recording medium, the first magnetic layer having a magnetic pole tip which has a uniform width portion for defining a write track width on the recording medium and extends from the air-bearing surface to a predetermined position on the reference layer in direct contact with the surfaces of the write gap layer and the reference layer, a magnetic pole coupler located in the back gap area in contact with the second magnetic layer, and a yoke which magnetically couples the magnetic pole tip with the magnetic pole coupler;

a thin film coil located between the first and second magnetic layers;

an insulating layer covering an inner surface of a recessed space surrounded by the write gap layer, the reference layer, the magnetic pole tip, and the magnetic pole coupler, wherein a recording-medium-side edge of the reference layer defines a reference position to the air-bearing surface; and a surface of the magnetic pole tip, the surface being on a side opposite to the write gap layer, and edge surfaces of the insulating layer are planarized in one plane.

4. A method of manufacturing a thin film magnetic head comprising steps of:

forming a write gap layer made of non-magnetic material;

selectively providing a reference layer made of non-magnetic material in a predetermined area on a recording medium side in contact with a surface of the write gap layer;

forming first and second magnetic layers to be magnetically coupled to each other in a back gap area on an opposite side of an air-bearing surface facing the recording medium, the first and second magnetic layers including two magnetic poles which face each other with the write gap layer in between and are positioned to face with a recording medium, the first magnetic layer having a magnetic pole tip which has a uniform width portion for defining a write track width on the recording medium and extends from the air-bearing surface to a predetermined position on the reference layer in direct contact with the surfaces of the write gap layer and the reference layer, a magnetic pole coupler located in the back gap area in contact with the second magnetic layer, and a yoke which magnetically couples the magnetic pole tip with the magnetic pole coupler;

forming a thin film coil between the first and second magnetic layers;

forming an insulating layer to cover an inner surface of a recessed space surrounded by the write gap layer, the reference layer, the magnetic pole tip, and the magnetic pole coupler; and planarizing a surface of the magnetic pole tip to form one plane with at least edge surfaces of the insulating layer, the surface of the magnetic pole tip being on a side opposite to the write gap layer, wherein the reference layer is formed so that a recording-medium-side edge of the reference layer defines a reference position to the air-bearing surface in the step of forming the reference layer.

* * * * *